United States Patent
Youngworth

(10) Patent No.: US 9,697,226 B1
(45) Date of Patent: Jul. 4, 2017

(54) NETWORK SYSTEM TO DISTRIBUTE CHUNKS ACROSS MULTIPLE PHYSICAL NODES

(71) Applicant: Saratoga Speed, Inc., San Jose, CA (US)

(72) Inventor: Chris Youngworth, San Jose, CA (US)

(73) Assignee: Sanmina Corporation, San Jose, CA (US)

(*) Notice: Subject to any disclaimer, the term of this patent is extended or adjusted under 35 U.S.C. 154(b) by 114 days.

(21) Appl. No.: 13/967,289

(22) Filed: Aug. 14, 2013

Related U.S. Application Data

(60) Provisional application No. 61/840,796, filed on Jun. 28, 2013.

(51) Int. Cl.
*G06F 17/30* (2006.01)
*G06F 3/06* (2006.01)

(52) U.S. Cl.
CPC ........ *G06F 17/30194* (2013.01); *G06F 3/067* (2013.01); *G06F 3/0655* (2013.01); *G06F 2221/0784* (2013.01)

(58) Field of Classification Search
None
See application file for complete search history.

(56) References Cited

U.S. PATENT DOCUMENTS

| | | | |
|---|---|---|---|
| 7,567,188 B1* | 7/2009 | Anglin et al. | 341/63 |
| 7,680,950 B1 | 3/2010 | Slaughter et al. | |
| 8,407,448 B1 | 3/2013 | Hayden et al. | |
| 2005/0283655 A1* | 12/2005 | Ashmore | G06F 11/004 714/6.32 |
| 2006/0161704 A1* | 7/2006 | Nystad | G06F 9/54 710/105 |
| 2006/0248273 A1* | 11/2006 | Jernigan et al. | 711/114 |
| 2007/0174662 A1* | 7/2007 | Zelikov et al. | 714/5 |
| 2007/0283093 A1* | 12/2007 | Zohar et al. | 711/114 |
| 2009/0157641 A1 | 6/2009 | Andersen et al. | |
| 2010/0057680 A1 | 3/2010 | Little | |
| 2013/0080488 A1* | 3/2013 | Li | G06F 11/0709 707/831 |
| 2014/0108863 A1* | 4/2014 | Nowoczynski et al. | 714/15 |
| 2014/0115244 A1* | 4/2014 | Maybee | G06F 12/0897 711/105 |
| 2014/0229452 A1* | 8/2014 | Serita et al. | 707/692 |

(Continued)

OTHER PUBLICATIONS

"ExpressFabric® PCI Express as a Converged, Rack-Level Interconnect", PLX Technology, (May 2013), 1-16.

(Continued)

*Primary Examiner* — Jared Rutz
*Assistant Examiner* — Charles Choi
(74) *Attorney, Agent, or Firm* — Schwegman Lundberg & Woessner, P.A.

(57) ABSTRACT

A method of storing a file in a storage system that includes a plurality of memory-storage hosts includes: providing unique chunk identifiers for memory chunks included in the file; using a hash mapping to identify one or more storage locations for each chunk identifier, each storage location corresponding to a portion of a memory-storage host; and storing each memory chuck at the corresponding one or more storage locations identified by the hash mapping.

18 Claims, 10 Drawing Sheets

(56) References Cited

U.S. PATENT DOCUMENTS

2015/0006846 A1  1/2015 Youngworth

OTHER PUBLICATIONS

"HP Moonshot System", Family Data Sheet © 2013 Hewlett-Packard Development Company, (Apr. 2013), 8 pgs.
"HP Moonshot System—Technical White Paper", © 2013 Hewlett-Packard Development Company, (2013), 1-8.
"HP Moonshot: An Accelerator for Hyperscale Workloads", © 2013 Moor Insights & Strategy, (2013), 9 pgs.
"Juniper Networks QFabric: Scaling for the Modern Data Center", © 2011 ACG Research, (2011), 1-9.
"Non-Transparent Bridging Simplied—Multi-Host System and Intelligent I/O Design with PCI Express", © 2004 PLX Technology, Inc., (2004), 4 pgs.
"Product Overview—Brief Overview of the Product Families & Applications", PLX Technology, (May 2013), 1-46.
"QFabric tm System", © 2013 Juniper Networks, Inc., (Jun. 2013), 12 pgs.
"Technology Brief PCI Express", PLX Technology, (2003), 5 pgs.
"The data center of tomorrow: How disruptive will new technologies be?", © 2013 Goldman Sachs, (Apr. 10, 2013), 1-34.
"White Paper: Egenera Cloud Suite", © 2013 Egenera Inc., (2013), 8 pgs.
Blake, Bob, "Choosing the Right Programmable Logic Solution for PCI Express Applications", [online]. Retrieved from the Internet: <URL: http://www.rtcmagazine.com/articles/view/100327>, (Apr. 2005), 1-7.
Budruk, Ravi, "PCI Express(r) Basics", © 2007, PCI-SIG, (2007), 40 pgs.
Hutchinson, Lee, "The SSD Revolution / An ARS Technica Feature", Solid-state revolution: in-depth on how SSDs really work, (Jun. 4, 2012), 1-27.
Morgan, Timothy P., "'Til heftier engines come aboard, HP Moonshot only about clouds", [online]. [retrieved on Apr. 9, 2013]. Retrieved from the Internet: <URL: http://www.theregister.co.uk/2013/04/09/hp_moonshot_server_analysis/>, (Apr. 9, 2013), 1-8.
Myslewski, Rik, "HP wants to help you mount a Moonshot", [online]. [retrieved on Nov. 3, 2013]. Retrieved from the Internet: <URL: http://www.theregister.co.uk/2013/11/02/hp_pathfinder_innovation_ecosystem_and_discovery_lab/>, (2013), 3 pgs.
Regula, Jack, "Using Non-transpatent Bridging in PCI Express Systems", PLX Technology, Inc., (Jun. 1, 2004), 1-31.
Vahdat, Amin, "The Emerging Optical Data Center", OSA/OFC/NFOEC 2011, (2011), 3 pgs.
U.S. Appl. No. 14/213,665, filed Mar. 14, 2014, Network System to Distribute Chunks Across Multiple Physical Nodes With Disk Support for Object Storage.
U.S. Appl. No. 14/552,387, filed Nov. 24, 2014, Network System to Distribute Chunks Across Multiple Physical Nodes With Disk Support for Object Storage.
"U.S. Appl. No. 14/552,387, Non Final Office Action mailed Jun. 3, 2015", 17 pgs.
"U.S. Appl. No. 14/552,387, Response filed Oct. 5, 2015 to Non Final Office Action mailed Jun. 3, 2015", 14 pgs.
"U.S. Appl. No. 14/552,387, Final Office Action mailed Nov. 20, 2015", 23 pgs.
"U.S. Appl. No. 14/552,387, Non Final Office Action mailed Jun. 15, 2016", 22 pgs.
"U.S. Appl. No. 14/552,387, Response filed Feb. 18, 2016 to Final Office Action mailed Nov. 20, 2015", 13 pgs.
"U.S. Appl. No. 13/967,296, Response filed Jan. 23, 2017 to Non Final Office Action mailed Sep. 20, 2016", 11 pgs.
"U.S. Appl. No. 13/967,296, Non Final Office Action mailed Sep. 20, 2016", 15 pgs.
"U.S. Appl. No. 14/552,387, Final Office Action mailed Dec. 7, 2016", 26 pgs.
"U.S. Appl. No. 14/552,387, Response filed Sep. 15, 2016 to Non Final Office Action mailed Jun. 15, 2016", 16 pgs.

\* cited by examiner

```
1   Initial Conditions:
        •   64 bit random number (rand)
        •   Lower 32 bits of rand (rand_pri)
        •   Upper 32 bits of rand (rand_sec)
5       •   Node_index = rand_pri & top_mask
    top_of_pseudocode:
    /*
     * The top_mask provides a random number in the set 2**x that is the ceiling for
     * the number of active nodes.  Top bit is the top bit that is not masked off by
10   * top mask.
     */
    if !(Node_index & top_bit) {
      Exit; /* you have the index */
    } else {
15    /*
       * The upper portion of the node index table is contained in the count above
       * top bit.  However, the random number set is going to have members that do
       * not fit within the domain.  Therefore we do a check for > our top node.  If found
       * we start our check again with the secondary rand.  In this way we can keep a
20     * better balance.  On the mapping of the values that came in above our node field.
       * If we see another miss on the top half of our range, we shift the primary xor it with
       * the secondary and with the top mask and drop the top bit.  The result should be a
       * fairly random mapping the secondary rand to a value in the lower half of our node range.
       * This will cause a slight imbalance in mapping frequency between lower and upper half
25     * nodes.  This can be compensated for if necessary through the weighting function.
       */
      if !(node_index > top_node) {
         exit /* you have the index */
      } else {
30       If (!secondary) {
            secondary = TRUE;
            node_index = rand_sec & top_mask;
            goto top_of_pseudo;
35       } else {
            node_index = ((primary ror 16) xor secondary) & top_mask & ~top_bit;
            Go to weighting algorithm or exit;
         }
      }
40  }
```

FIG. 7

NETWORK SYSTEM TO DISTRIBUTE CHUNKS ACROSS MULTIPLE PHYSICAL NODES

CROSS-REFERENCE TO RELATED APPLICATIONS

This application claims the benefit of U.S. Provisional Application No. 61/840,796, filed Jun. 28, 2013, which is incorporated herein by reference in its entirety.

FIELD

The present disclosure relates generally to computing and more particularly to computer storage systems.

BACKGROUND

Conventional storage systems have limited capabilities for adding or deleting storage elements and for responding to system failures.

BRIEF DESCRIPTION OF DRAWINGS

Some embodiments are illustrated by way of example and not limitation in the figures of the accompanying drawings.

FIG. 7 is a listing of pseudocode that describes a remapping algorithm for an example embodiment that is based on the CRUSH algorithm.

DETAILED DESCRIPTION

Example methods and systems are directed to computer storage systems. The disclosed examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
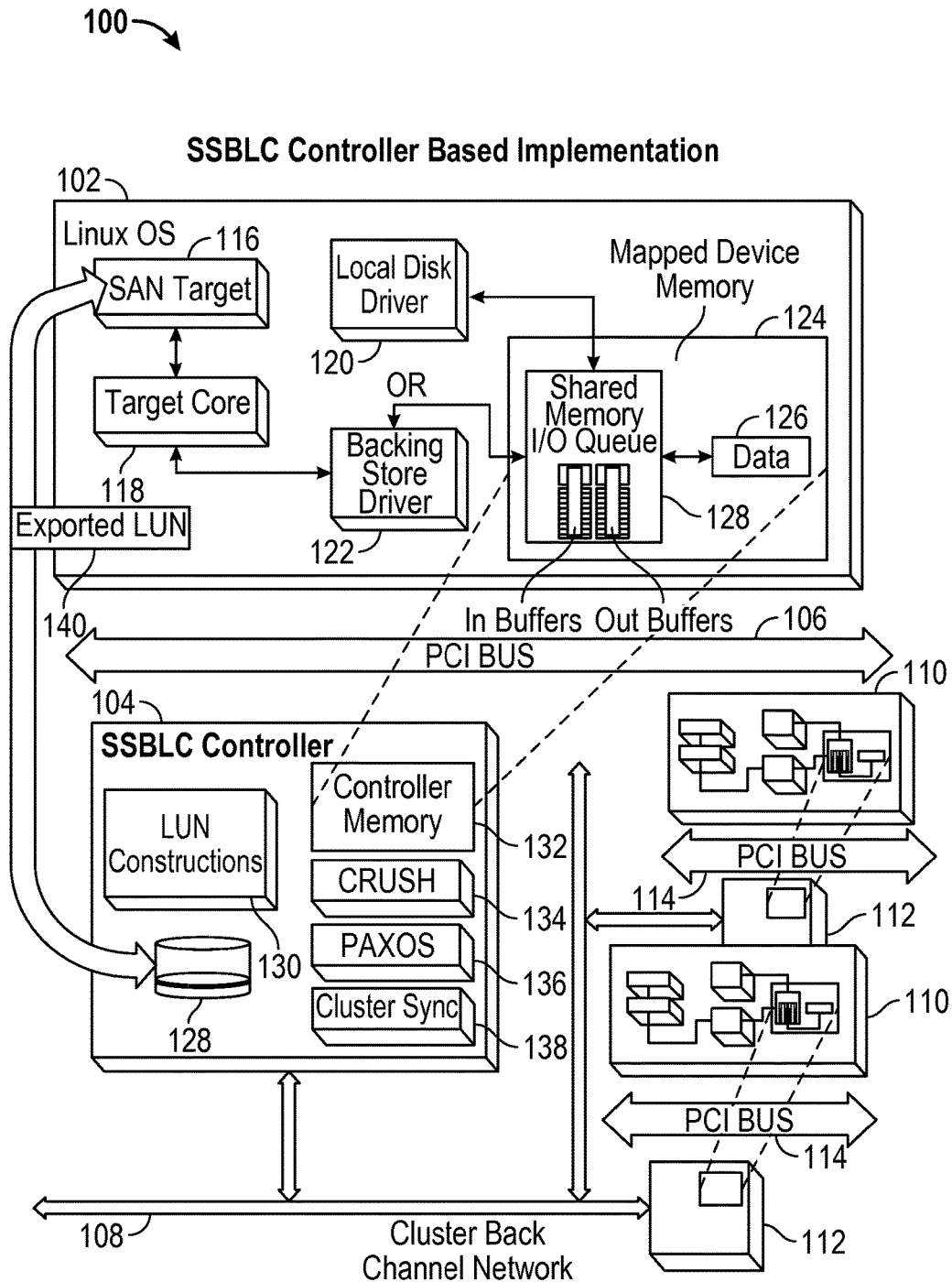
FIG. 1 is a diagram that shows a storage system for an example embodiment.

FIG. 1 is a diagram that shows a storage system 100 for an example embodiment. The system 100 includes a host system 102 (or host) with a corresponding controller 104 connected by a PCI Bus 106. The system 100 may be connected through a cluster back channel network 108 to additional combinations of host devices 110, controllers 112 and PCI buses 114. The host system 102 typically operates with a conventional operating system (e.g., Linux OS) and includes elements for a SAN Target 116, a Target Core 118, a Local Device Driver 120, a Backing Store Driver 122, and a Mapped Device Memory 124 that accesses Data 124 with a Shared Memory I/O Queue 126 for communication with the Controller 104 as discussed below. The controller 104 includes elements for storage 128, Logical Unit Number (LUN) Constructions 130, and a Controller Memory 132 that corresponds to the mapped device memory of the host system 102. The controller 104 also includes a CRUSH module 134, a PAXOS module 136, and a cluster sync module 138. As discussed below, an exported LUN 140 that utilizes the storage 128 is presented to a client via the SAN Target 116.

The system 100, also described as Saratoga Speed Block Level Cluster (SSBLC), will typically sit behind a SAN target or be present as block level device. Thus it will present a LUN or disk. SSBLC is capable of providing all of the storage across all of its clusters as a single LUN. Such a LUN could be accessed across all of the nodes in the system. The SSBLC is also capable of breaking the storage into any number of LUNs with each node having its own metadata and management of the underlying LUNs. The LUNs can again be accessed from any node in the cluster.

SSBLC exists as a block level device and as a low level device in a unified SAN target software stack. It has a front end adapter to plug into the TCM/LIO stack. The adapter behaves as a device driver. The SSBLC code is run on a separate processor card as a controller.

Mapping between abstract LUN structures and the physical storage is done using a stand-alone hashing library. The LUN ID along with information about the offset of the data, the storage policy, and state of the cluster are fed into the library and result in a determinant repeatable mapping to a specific disk or set of disks within the cluster. The library is an implementation of the CRUSH concept. (Weil, Sage A., Scott A. Brandt, Ethan L. Miller, and Carlos Maltzahn. "CRUSH: Controlled, Scalable, Decentralized Placement of Replicated Data." ACM (University of California, Santa Cruz), 2006)

The CRUSH based hashing library, (henceforth CRUSH), is changed when a node is brought on or dropped. It is maintained on each physical node. Therefore, changes must be synchronized between nodes. To effect this, PAXOS is used. (Lamport, Leslie. "The Part-Time Parliament." ACM Transactions on Computer Systems, 1998.). Coordination between old and new CRUSH states is undertaken at the node level based on PAXOS events driven from the Primary node.

It is possible to port the SSBLC and run it as an operating system kernel module. However it is designed to run on a stand-alone adapter. In this guise it offers the maximum flexibility and it takes advantage of stacked hardware. The back channel can be isolated from the operating system networks, memory and CPU activity. By changing the device driver it may run on one or more operating systems.

One can choose either a disk device driver or a low level unified SAN stack driver. In this way the controller may be used to implement a stand-alone storage platform, or a higher powered node in a clustered big data or other HPC configuration. A hypervisor may be employed by the host system. In this case, use of a shared memory based virtual device driver for disk for each of the guests can allow for maximal throughput with minimal latency and overhead to a collection of virtual machine guests. The virtual disk driver may be accompanied by direct I/O hardware support.

Figure 2:
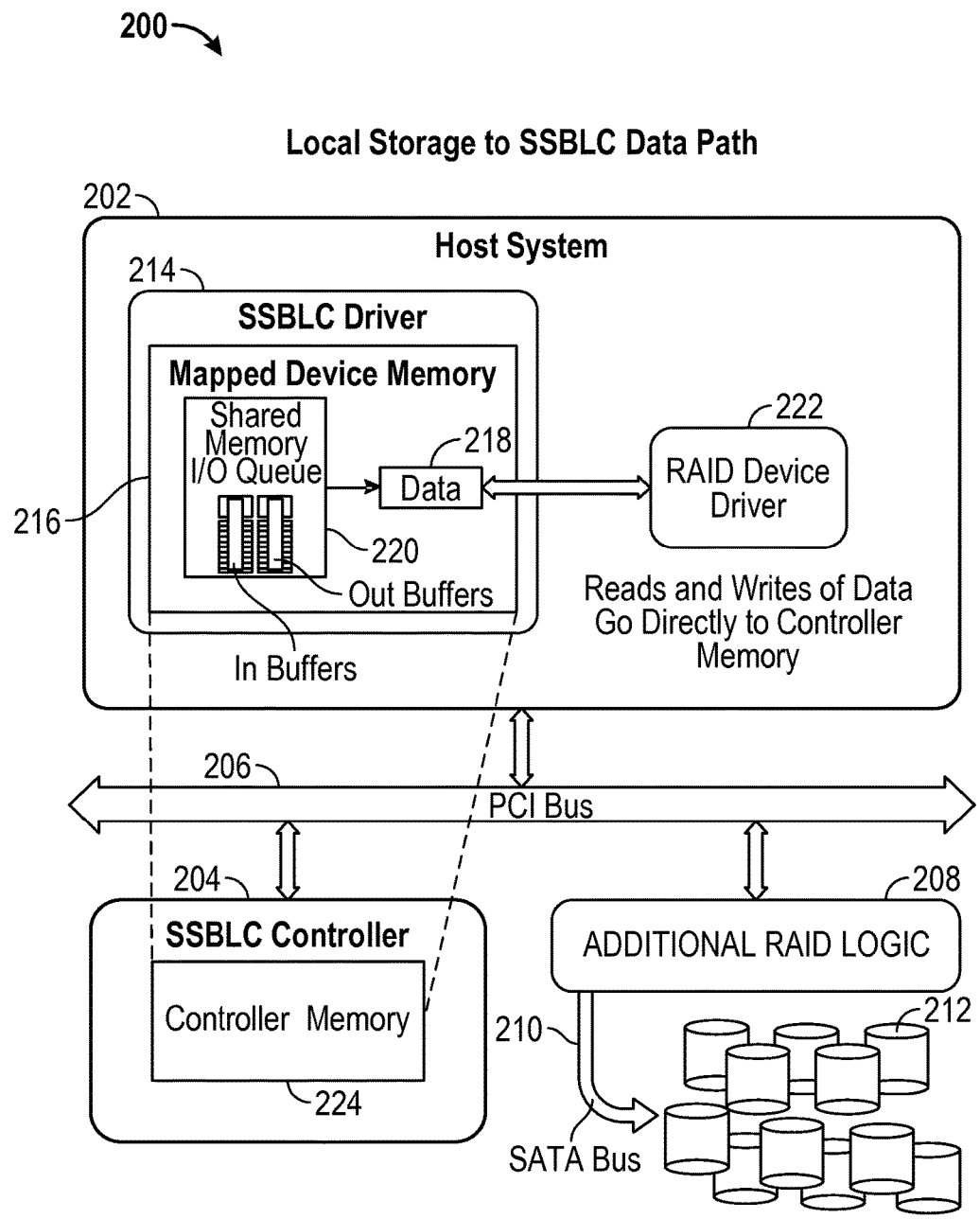
FIG. 2 is a diagram that shows a storage system for an example embodiment with reference to the SSBLC Controller Data Path.

FIG. 2 is a diagram that shows a storage system 200 for an example embodiment with reference to the SSBLC Controller Data Path. The system 200 includes a host system 202 with a corresponding controller 204 connected by a PCI Bus 206. The PCI Bus 206 also connects to additional RAID Logic 208 that is connected to additional storage 212 through a SATA bus 210. The host system 202 includes a driver that includes a mapped device memory 216 with data 218 that is accessed through a shared memory I/O Queue 220. The host system 202 additionally includes a RAID device driver 222. The controller has a controller memory 224 that corresponds to the mapped device memory 216 of the host system 202.

The mapping of the SSBLC controller memory is essential for high performance connection with Infiniband targets and other direct transfer devices. It is equally important however on the local disk attachment side. Each SSBLC physical node finds its disk storage on the other side of a disk controller or an HBA. By mapping the SSBLC controller memory into the operating system space, data transfers between the SSBLC controller and the HBA will actually be controller to controller across the PCI bus, bypassing main memory.

Each SSBLC physical node finds its disk storage on the other side of a disk controller or an HBA. By mapping the SSBLC controller memory into the operating system space, data transfers between the SSBLC controller and the HBA will actually be controller to controller across the PCI bus, bypassing main memory.

Advanced hardware models are supported. The SSBLC controller vends LUNs to the operating system, either as local disks or as input into a unified SAN storage stack. The actual methods behind vending these LUNs is hidden behind the common disk interface. This means that SSBLC implementation has no implementation constraints. In future it may be advantageous to pull local disk management into the SSBLC controller domain and away from the purpose built HBAs and RAID controllers. In this case the main memory segment of the data path may be removed. The shared memory model remains an advantageous element and will then either be based on real shared memory or a mapping between two individual cards on a PCIe or other bus.

When it comes to virtual device support in a hypervisor setting, the disk driver model offers the best abstraction for performance and low overhead. The driver model however exposes an enhanced device. The emulated disk controller takes virtual addresses instead of physical ones. This allows the device/device emulation in the hypervisor to make use of address mapping hardware to translate guest virtual to guest physical and guest physical to machine physical page mappings. Regardless of hardware support, the arrangement also allows for fewer context switches between guest and hypervisor and faster startups on large I/Os. Faster startups are accomplished by translating only the first few pages of a large I/O request and then beginning the I/O. While that I/O is underway a portion of the remaining transfer request can be translated. Since the translation is done inside the hypervisor, inside the device emulation, the rolling request can be executed without context switches back into guest space.

The enhanced disk device also has SSBLC properties. The communication between the virtual machine and the device emulation is done through shared memory queues that are resident in SSBLC memory mapped controller memory. Signaling of I/O requests is done via a hardware doorbell register resident on the SSBLC card. This allows the guest to avoid hypervisor context switches altogether on communication with the SSBLC. Each guest is given a unique doorbell register. Each guest is also given a unique portion of the device memory space.

The setup of the SSBLC virtual disk device is done using a virtual device model that removes unnecessary hardware-related I/O idiosyncrasies such as bus registers. All communication is done through interrupts and shared memory. The model is extended to include a virtual bus. In this way the extensive functionality associated with plug-in events, bus discovery, and configuration support can be done in software and the bus can be made to support the simplified device model, allowing the SSBLC to support large numbers of guests and deliver maximal throughput with minimal overhead. This is in contrast to I/O Virtualization (IOV) methods which require large hardware based bus emulation efforts for each guest instance.

The abstracted, virtual bus that supports SSBLC characterizes devices as distributable services that are identifiable through a world-wide name. In this way a data-center-wide provisioning management service may be consulted when connecting a guest with a device. In this way, guests may be connected with an SSBLC device even when they are on a physical platform that does not have an SSBLC controller. In addition, the indirection may be introduced when there are too many guests to be supported by an SSBLC controller. The rerouting of services may be done on a dynamic basis thus providing full balancing control over access to the client interface of the SSBLC.

With respect to the management of Logical Unit Numbers (LUNs), the management traffic can run through either the back-channel or the host depending on the configuration. In the host case, a separate device driver is needed. Provisioning for disks, virtual disks, LUNs, and targets are all done through this traffic.

Creation of a LUN is independent of its target or disk deployment. The LUN's mirror data will reside across the clustered nodes. The configuration of the storage, the properties of the LUN, other than its size and performance characteristics are hidden from the exported target or disk.

The export of the LUN from the SSBLC controller is accomplished via mapping of the device memory of the SSBLC. The SSBLC device driver communicates requests and out of band commands and events through a shared memory queue. The queue is set up to make maximal use of the shared address space, avoiding interrupts during streaming mode execution. The buffers in the queue hold the various SSBLC controller commands. Low level read and write commands point to regions of the SSBLC device memory where data can be read or written. The use of mapped device memory in this way allows SAN target hardware to write and read data directly from the controller, bypassing the main system memory and avoiding unnecessary copies. Use is made of the I/O read, modify, write mechanism for mapped device memory to avoid unnecessary synchronization interrupts.

Depending on the details of the operational setting the SSBLC system 100 may provide a number of advantageous cluster properties. Clustering support can ramp with as little as two nodes, though it will not be fully functional. A fully functional cluster can be started with as few as 3 nodes, though it will not meet minimal high availability parameters. A fully featured cluster can be started with as few as 5 nodes.

Storage utilization and client access is dynamically balanced across the physical nodes without regard to file size or LUN configuration. (Outside of special LUN performance characteristics). Each physical node operates as a back end and a front end. In the front end storage is exported to clients via a SAN interface. The interface may be iSCSI, IB, or any of the other of the unified SAN targets. To satisfy the storage request the back end is employed. It is here that the mapping to the local and clustered set of disks is employed to provide the properties of the SSBLC system.

LUN management and target creation functions may be implemented within the SSBLC and invoked through a management interface. An external provisioning agent interacts through this management interface and uses a special LUN and target within the SSBLC for its database All of the storage across all of the physical nodes, (except that used for cluster administration), may be viewed as a single LUN or may be carved up into any configuration of LUNs. All physical storage can be accessed from any physical node. All physical storage is exported via one or more SAN LUNs. According to one embodiment, Logical LUN space is presented as a 128 bit address. It is configured as follows: 32 bits Physical Node ID||32 bits LUN ID||64 bits offset in 4 k blocks. In this context, each physical node may present up to 2**32 LUNs, where the LUNs are accessible from any physical node. To access a LUN an exported LUN WWN may be employed via traditional SAN methods for the transport employed.

Typically all LUNs are segmented. The segments are backed with storage according to HA and performance LUN policy via CRUSH. A client has no control over, nor knowledge of where data resides within the cluster. The segments of storage are typically mapped to physical disks by a cluster wide mapping algorithm. The algorithm may be present on each of the physical nodes so that lookups can be performed without requiring access to a single or select group of nodes where the lookup mechanism is based on CRUSH.

State changes for the cluster must be managed so that all nodes are coordinated. Each node has a copy of the CRUSH algorithm. These copies must all agree at all times. PAXOS (Lamport 1998) may be employed as the overlying method to manage state change. A coordinated, 3-step transition is then employed. First, all nodes made aware of new CRUSH/system state. Second, all nodes create remap tables of data to be moved from them and pass them to the nodes which will receive the data. Client-motivated reads and writes of data in transition are blocked behind chunk transition. An I/O request targeting a block of data that is scheduled for remapping causes the remapping event to be undertaken immediately. In this way the I/O request wait will be brief. Third, once data is remapped, old CRUSH is dropped.

FIG. 7 is a listing of pseudocode that describes a remapping algorithm for an example embodiment that is based on the CRUSH algorithm. As illustrated by this example, CRUSH algorithm construction and behavior impact more than just the immediate placement of data. The choice of CRUSH mapping algorithm is critical in determining the properties for the movement of data when there is a change in the number of nodes. In this example we will construct an algorithm that tracks and maximally preserves the placement of data for a node across the number of nodes in the cluster in such a way as to limit the movement of data when new nodes are introduced. Using this method we can limit the amount of data that must be remapped from a chunk to something that approximates the amount of data the new storage will need to share with a new node. That is, if we have 9 nodes, all with the same storage size and we introduce a 10th node. The new crush algorithm will limit the movement of data to that data which must reside on the new disk.

To implement the algorithm we will rely on a random number generator, generating 64 bit numbers and the natural set arithmetic inherent in binary number representation. To pick a node/disk, we start with a random number. The maximum number of nodes/disks is 232 but we will create a 64-bit random number. We will take the first 32 bits and apply a mask. The mask zero's out the top bits of the 32 binary field such that the node set field is 2expX CEIL of the number of nodes in the system. That is, if there are 34 nodes in the system, the mask will zero out all except the lower 6 bits. 26 represents a set with 64 entries, our nodes are a set with 32.

We then assign the numerically lowest values 0-33 to the existing nodes/disks. By doing this we fix the place of these entries as we add new nodes. We also guarantee the filling of all of the lower values with viable targets. In this way if the top bit, in this case bit 6 is zero, all of the corresponding combinations of the remaining 5 bits result in a numerical value assigned to an existing node/disk. We rely on this to simplify our mapping algorithm.

If the value after masking is numerically greater than the number of nodes more work is required. Taking the idea of 2**x sets recursively down we can see that logically The work of testing membership requires a set cascaded masks however a simple numerical "greater than" achieves the same result, allowing the ALU to do the work for us.

If the value of the masked random number is greater than the numerical/ordinal value of the top member of our cluster then we must remap our random number. Our first attempt to remap consists of taking the second 32 bits of our random number and running the same algorithm. If this works, we have spread our remapped case evenly across all of the member nodes/disks. If not we shift the first set of 32 bit random number by 16 places and xor it with the second set. We then apply our top mask and mask off the top bit of our valid set space. In this way we will spread the remaining values across what in worst case will be nearly half of our resident nodes/disks.

The method above gives perfect remapping behavior in that no data is remapped between nodes that persist between CRUSH algorithm changes that are done to increase the number of nodes/disks. Its data balance is also good. There is a slight bias for the nodes of numerically lower value but it is bound in all cases and decreases as the node set increases. Further, the impact of an increasing number of nodes in the upper half of a given node space on balance is mitigated by doing a second hash. As the number of nodes in a given node space increases the likelihood of missing and needing a remap decreases. The likelihood of missing is again reduced by doing the lookup twice with an independent random number. Only the misses then from the 2 lookups are in need of a remap. This set is then given a semi-random scramble via a shift and xor between the two 32 bit random fields and then the top bit of the node range is zeroed. Thus the remap is pushed into a subset of the active nodes. More compute intensive means could be employed to bring a random spray to the last remapping but this is deemed unnecessary at present.

Further, it should be pointed out that there is a weighting field available for each node/disk. We take the xor of the two halves of the random number and apply them in a comparison with a fixed value. The fixed value will be a number that represents a proportion in the set of numbers within the number set 2**32. i.e. If we want a weight of 50%, the fixed number is 2147483648. This is half of 4294967296. If rand >2147483648 we apply a scrambling algorithm to our random number and re-select.

Figure 3:
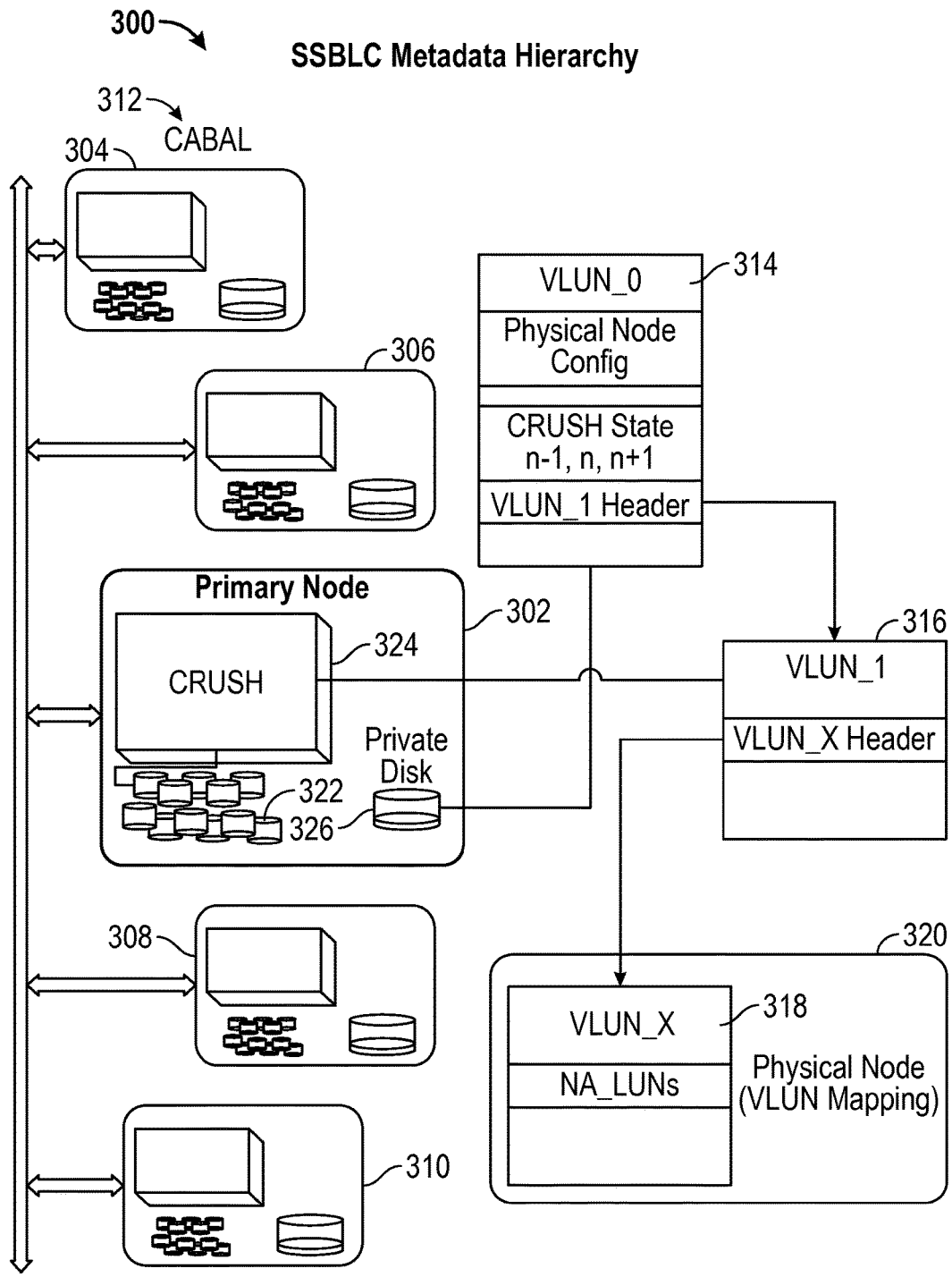
FIG. 3 is a diagram that shows a storage system for an example embodiment with reference to the SSBLC Metadata Hierarchy.

FIG. 3 is a diagram that shows a storage system 300 for an example embodiment with reference to the SSBLC Metadata Hierarchy. The system 300 includes five host systems including a primary node 302 and four additional nodes 304, 306, 308, 310 that collectively make up a Cabal 312 that manages the metadata structures including VLUN_0 314, VLUN_1 316, and VLUN_X 318, for X≥2. Each of the nodes 302, 304, 306, 308, 310, which may correspond to the host system 102 of FIG. 1 or the host system 202 of FIG. 2, includes memory 322 that is accessed through a CRUSH module 324 as well as private disk storage 326. VLUN_0 314 may include a specification for the physical node configuration (e.g., storage sizes and IP addresses), Crush states indexed at n−1 (previous), n (current), and n+1 (future), and a reference to the VLUN_1 header. VLUN_1 316 may include a reference to the VLUN_X header. VLUN_X 318, which resides on a node 320 that provides storage (e.g., a CABAL node 312), may include references to node-associated LUNs (NA_LUNs) that correspond to storage provided at that node 320.

As discussed above, the core cluster synchronization can be carried out by a variation on the Paxos algorithm. Some number of nodes, possibly five for small systems as in FIG. 3, will share core context for the physical cluster. This information will include, the membership of the cluster, the CRUSH algorithm in force, the layout of virtual LUNS that track each physical nodes NA_LUNS, and any cluster log and event history.

All of a clusters core information could be kept on a single platform but this would violate fault tolerance and HA compliance. It would also make scaling of information dissemination difficult. The existence of a distributed database however requires synchronization. We will choose a version of the Paxos algorithm to provide this synchronization. Liveliness will be ascertained and monitored through corosync, Pacemaker, and other ping based heartbeat mechanisms.

In a conventional implementation, Paxos will elect a president (e.g., primary node 302) out of the core cluster members (e.g., a synod). This president will propose all changes to the cluster. The president will be chosen as the physical node whose ID has the lowest ordinal value. Once a president has been chosen it will remain president until it is deemed separated or dead from the synod or is found incompetent. At this point a new vote will take place and the node with the lowest ID value of the remaining synod members will be chosen.

The Paxos decrees will all be high level, i.e. new member additions, CRUSH algorithm changes, etc. The standard crush algorithm will be followed. The president will propose a vote based on a ballot number one higher than the last. The reply from the synod members will optionally offer up any missing state info for earlier decrees. The president will move to accept request if he has a quorum of replies on the new ballot request. After the president gets back a quorum on the accept request, the decree is sent to all of the synod nodes. The rest of the nodes in the cluster will behave as listeners. An event mechanism will be instituted to efficiently broadcast cluster state changes.

In general, there are two choices for CRUSH update within the cluster. One can either stop all activity until every node has been alerted of a CRUSH change or build transition management into the process. The latter is far less disruptive for ongoing work and probably easier to maintain. In order to maintain integrity a list of conditions must be met in the requester/server interface: (1) Crush ID is provided on each I/O request; (2) the Crush ID must be the latest as the server sees it or it will reject the I/O as stale requester; (3) writes must only take place against new Crush IDs; (4) regular reads must only be done against the new Crush ID; (5) recovery reads may be done against the old crush mapping; (6) if a reader gets halfway through a mirror write sequence and experiences a stale requester return it must suspend the I/O, update to the new ID and start the write sequence over; (7) any server that sees a request for a higher Crush ID than its current must pause and update, and any current read or write taking place can finish but no new writes or reads can be done on the old Crush ID after the update has finished; (8) a crashed, newly recovering node must go through its normal evaluation of on-disk contents and make stale mapping lists for new holders of old mirror data, these lists will be disseminated to the appropriate nodes, and any intervening Crush ID maps from partial recoveries are discarded. (This allows for one of a kind data recovery, long after node data has been deemed unrecoverable).

Balanced storage use across the cluster can be carried out through chunk IDs. Each storage segment or chunk has an ID. This ID is passed to CRUSH and a statistically distributed primary site for storage is returned, additional sites are returned for mirrors according to the policy accompanying the chunk ID. All LUNs are populated via chunks. The chunks afford independence of physical storage layout and utilization for LUN and file size and configuration.

The physical storage for chunks is provided by the low level SSBLC block manager. The SSD/disk system allocates storage in chunks. In the case of SSD's however, the size of the writes to these chunks determines how much storage is actually acquired. That is, if a chunk is allocated, but only the first page is written to, only a single page of actual storage is allocated within the SSD. In this way block level over-provisioning is accomplished. SSD's run with a log based file system and refresh their data. This has fortuitous implications for overprovision support. (Note: In some embodiments, CRC checksum support may be adjusted to account for the virtual zeros of pages in chunks that have been allocated but not filled.)

In certain large clusters with diverse physical nodes, the performance properties may not be uniform for all sites. As part of its policy engine CRUSH will maintain knowledge of these differences and allow for storage provision at the chunk level according to the performance policy of the associated LUN.

In order to access the storage across the SSBLC cluster, the disks must be organized to reflect their physical location. Further, since each of the physical cluster nodes also serves as a target for clients the LUN hierarchy must reflect the site location of the LUNs. The physical cluster layout is reflected in the CRUSH policies that keep track of rack, node, physical location, network hierarchy. The logical layout is handled by the LUN metadata.

By creating a hierarchy of LUN definition it is possible in most cases to free LUN creation and LUN expansion from multiple writer conflicts. It is also possible to protect the central organizing tree of the LUN hierarchy through higher mirror policy and special CRUSH dispensation with respect to CHUNK mapping.

In keeping with the isolation of the metadata updates to individual physical nodes, the enumeration of chunks IDs is localized. When an area of storage is allocated it must be associated with a chunk ID. This chunk ID assignment must be unique across the system. In order to both keep chunk IDs unique and to avoid the need to consult a common authority, chunk ID numbering is made local to the LUN table. That is, each table has its own context for generating chunk IDs. To make the CRUSH action unique and to identify the unique storage bits, the data associated with a chunk is stored not only with its chunk ID but also its NA_LUN, and its VLUN.

With reference to VLUN_0 314 in FIG. 3, this virtual node holds all of the cluster information relating to physical node membership and the storage maps assigned to the member nodes. The storage maps that are assigned to physical nodes are kept in VLUN_1. Each physical node has assigned to it a storage map, or LUN space. The LUNs contained in the LUN space are accessible from any node in the system but they are created and administered by the node paired with the LUN space. Virtual node 0, "node_0", has a special LUN, vlun_0. All LUN mapping starts with virtual node/virtual LUN 0. Most metadata is mapped at the chunk level according to CRUSH. VLUN_0 however is the ultimate authority on the CRUSH map. VLUN_0 therefore must have its storage needs provided for outside of the CURSH system.

VLUN_0 is of a fixed size and has its chunks provided in a linear layout on physical disk. The special nature of VLUN_0 isolates it from the general mapping mechanism and CRUSH. VLUN_0 is present on the Primary node and on all of the 5 CABAL members. It is thus always possible to find the initial root of the Metadata tree. VLUN_0 holds the n−1, n, and n+1 CRUSH algorithms. (It does not need to keep older CRUSH algorithms. This info is found in a LOG which is kept on a VLUN and possibly on a legacy node which has been revived). VLUN_0 also holds the VLUN_1 Header. VLUN_1 holds the VLUN_X headers and other state information for all of the physical nodes.

With reference to VLUN_1 316 in FIG. 3, this virtual node acts as a storage map or VLUN repository. Each physical node is associated with a virtual LUN. The virtual LUN will hold all of the pointers (chunk_IDs) to the headers for the NA_LUNs associated with that node. Node Associated LUNs (NA_LUNs) hold the data associated with exported storage objects. VLUN_1 is special in the same way that VLUN_0 is. If VLUN_1 is not available, the cluster cannot be set up because the physical nodes cannot find their NA_LUN information. VLUN_1 however is of an indeterminate size and may grow in a way that cannot be predicted. Therefore, VLUN_1 is subject to CRUSH and is mapped through chunking. CRUSH will however make special dispensation through a VLUN_1 policy. This policy requires that the chunks for VLUN_1 be mapped amongst members of the CABAL and that the number of the mirrors be more than 50% of the number of CABAL members. In this way all the chunks of VLUN_1 will always be available when there is CABAL quorum.

With reference to the storage mapping objects VLUN_X (X≥2) 320 in FIG. 3, the virtual node is capable of having many VLUNs. The VLUNs are all defined by their association with node_0. In the same way that NA_LUNs are associated with a physical node for CRUSH purposes, the VLUNs are all attributable to node_0, the virtual node. All the VLUNs except VLUN0 and VLUN1 may be placed anywhere within the cluster via CRUSH chunk mapping on a VLUN policy. Each physical node has a VLUN associated with it at cluster initialization time. The VLUN holds physical node state information for the node assigned to it and also the headers for all of the LUNS it exports, the node associated LUNS, (NA_LUNs).

Depending on the operational setting, access to VLUN_0 and VLUN_1 may be restricted. VLUN_0 contains cluster configuration information as such it is not directly accessible for either read or by any entity other than the Primary node. CRUSH update calls, PAXOS events, client management calls, node loss and addition are all ways that the VLUN_0 is indirectly updated. VLUN_1 is also updated through the primary node, but in this case the guest is allowed to read and write the LUN indirectly. Functions to search for and update VLUN headers are available on the primary. In this way, the layout of VLUN_1 can be changed without affecting broader client management implementation. It is assumed that the VLUN headers in VLUN_1 will be laid out in a red/black tree for quick lookup. Calls will be available to read and write the headers and the chunk tables. Disposition of VLUN_1 is centralized due to the close relationship between the data held there and the high level layout of LUNs on the physical nodes. VLUNs 2 and on are filled with node associated information and so are distributed and subject to the primitive SSBLC multiple writers synchronization method.

Figure 4:
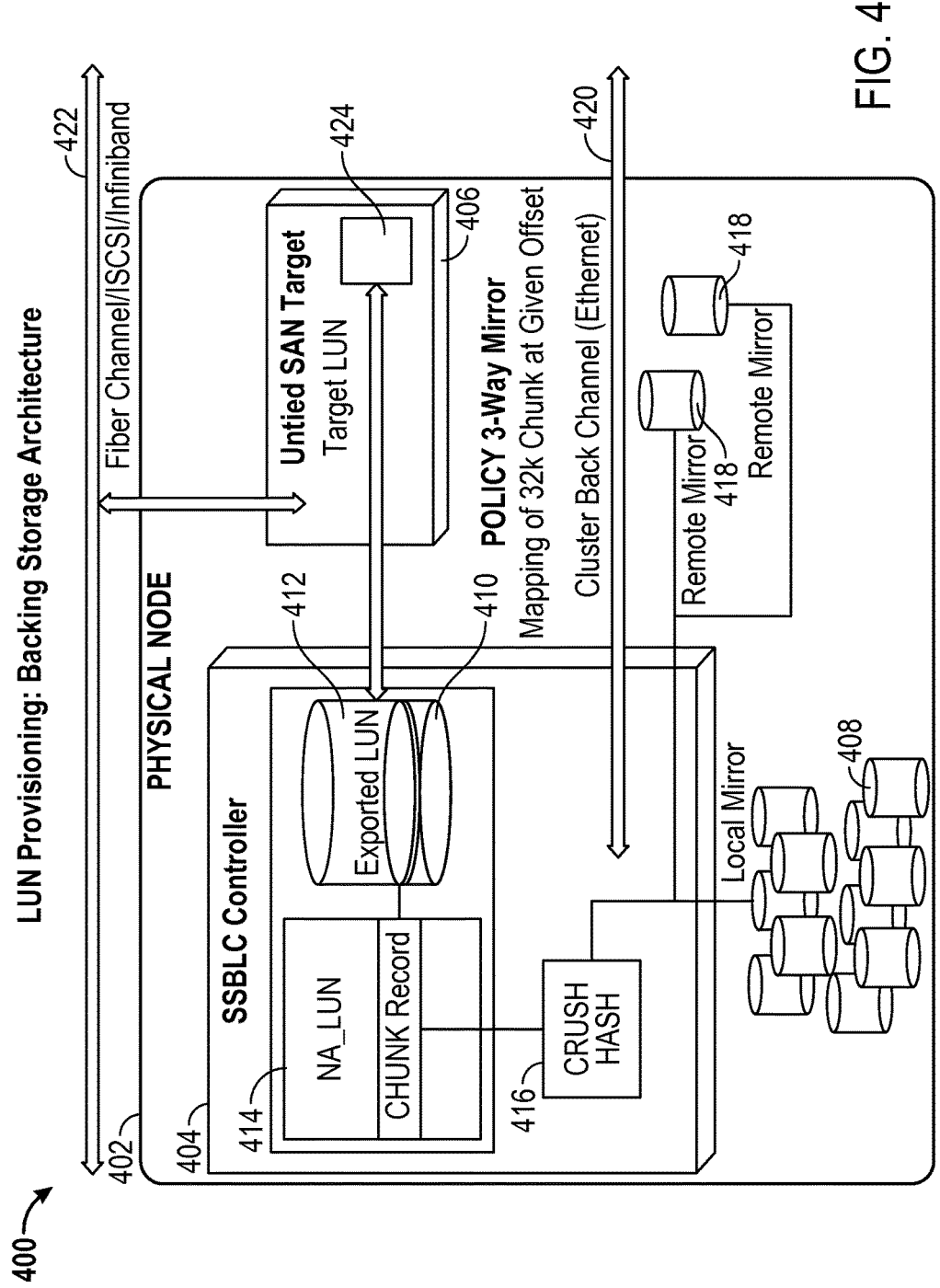
FIG. 4 is a diagram that shows a storage system for an example embodiment with reference to the provisioning of Logical Unit Numbers (LUNs) as storage units.

FIG. 4 is a diagram that shows a storage system 400 for an example embodiment with reference to the provisioning of Logical Unit Numbers (LUNs) as storage units. A physical node 402 includes a controller 404, a SAN target 406, and storage 408 that provides a local mirror for stored data. (Note that the physical node 402 may include other elements shown for the host system 102 and controller 104 shown in FIG. 1.) The controller 404 includes data structures 410 that relate the exported LUN 412 to the NA_LUN 414, which includes chunk records for the stored chunks of data. A CRUSH Hash module 416 maps a data chunk to locations in the storage 408 at the physical node 402 (e.g., as a local mirror) as well as storage 418 at remote nodes (e.g., as a remote mirrors) through a cluster back channel connection (e.g., Ethernet) 420. As shown in the figure, external clients may utilize a fiber channel 422 or equivalent networking structure to access a target LUN 424 at the SAN Target 406, where this target LUN 424 corresponds to the exported LUN 412.

As illustrated by FIGS. 3 and 4, Storage mapping is done in a 3 level hierarchy: (1) Node associated LUNs; (2) Fixed size segments/chunks within the node associated LUNs; and (3) Fixed size segments/chunks within the node associated disks.

Node associated LUNs are storage containers that are administered primarily by the node they are associated with. However, their content is mirrored as per the policy of the customer/administrator. Further, they are accessible from any node within the cluster. The association with a node allows node associated LUN creation to be easier and can impact where the mapping data of the LUN is kept, for performance reasons. The node associated LUN should not be confused with the exported LUN. According to policy a node associated LUN may have multiple mappings to exported LUNs which may be in-use simultaneously.

Figure 5:
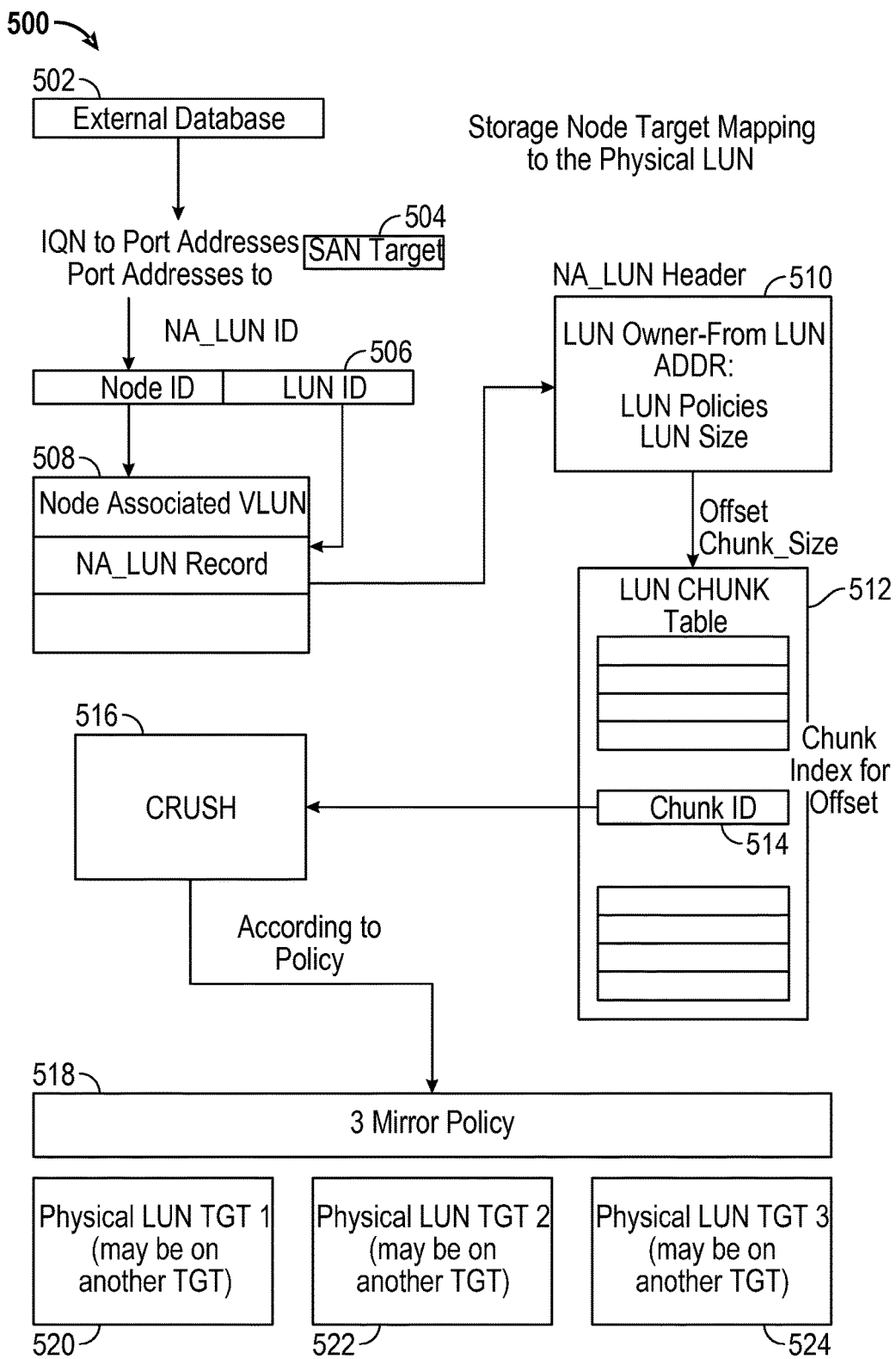
FIG. 5 is a diagram that shows LUN mapping structures corresponding to the embodiments shown in FIGS. 1-4.

FIG. 5 is a diagram that shows LUN mapping structures 500 corresponding to the embodiments shown in FIGS. 1-4. From an external database 502 (e.g., at an external client) a SAN target 504 is accessed (e.g., by mapping from an IQN to a port address and from the port address to the SAN target 504. The SAN target is mapped to the NA_LUN identifiers (IDs) 506 including a Node ID and a LUN ID. The two IDs 506 are then used to access a Node Associated VLUN 508 including an NA_LUN record corresponding to the LUN ID. The identified NA_LUN record is used to access the NA_LUN Header 510 which may include information such as LUN owner, address, policies and size. From the NA_LUN Header 510 a LUN Chunk Table 512 may be accessed through a Chunk ID 514 that is used with a CRUSH module 516 to access storage according to a 3-mirror policy 518 including a first target 520, a second target 522, and a third target 524.

The Node Associated LUN, (NA_LUN) is not exported directly to storage clients. It is mapped by a SAN IQN/WWN target. The Target mapping to NA_LUN is kept on the physical node or nodes that the client has been delegated to talk to. Multiple LUNS may be assigned to a target. The NA_LUN can be mapped by multiple targets. A method of sync writes for shared targets is maintained. It does not guarantee an order for writes from multiple clients but it does guarantee that only one version of the data will appear on all mirrored copies.

Target mappings are not kept within the SSBLC. A separate service that has administrative access to the physical nodes sets up the IQN/WWNs and queries for the NA_LUNs that are to be associated. This service is tied to the front-end load balancing and chooses which physical storage nodes will provide the targets for a client.

The number of physical nodes is kept in VLUN_0 along with other vital cluster level information such as the CABAL members and the header for VLUN_1. Mappings between the physical node and a VLUN that records all of the Node Associated LUNs for the physical node and other such cluster level configuration information is kept in VLUN_1. VLUN_0 is fixed in size and not subject to CRUSH, all other VLUNs are made up of CRUSH mediated chunks. The VLUN that is associated with the node, (VLUN_X), will hold a list of all of the active LUNs for that physical node. These LUNs are referred to as node associated LUNs or NA_LUNs and they are the objects that back the exported targets. This list, if big enough, will be a BTREE (e.g., Red/Black) of LUN arrays. Each Node Associated LUN, (NA_LUN), has a structure. In this structure the name of the LUN, size, policy, and other characteristics are recorded. In addition a BTREE, (probably Red/Black), of chunk arrays is maintained for all of the populated regions of the NA_LUN.

It is possible to simultaneously share access to an NA_LUN between nodes. Each new node requesting access makes its presence known by adding itself to the cache list in the header structure for the NA_LUN. For performance regions, a node will cache regions of the NA_LUN structure. There is no central locking authority for NA_LUNs so a special write behavior is employed All NA_LUNs can be shared potentially so any node choosing to open an NA_LUN must request a copy of the header and push its identity as a cache holder there. VLUN reads and writes are associated with a generation number that is stored with the chunk structure. This generation number is bumped with each write of the associated chunk. It is bumped through an enforceable protocol step and is not controllable by the client except that it be kept on reads and passed back on write attempts. The client node wishing to cache an NA_LUN will read the VLUN header records associated with the physical node responsible for the NA_LUN. Upon getting the chunk ID the NA_LUN header is associated with, a gRead will take place. The generation Read, or gRead will return the generation number of the associated chunk. The generation number will be kept by the caller.

While there is no general distributed lock utility in SSBLC, there is an underlying write synchronization mechanism for the chunk. The steps are as follows: (1) gREAD—get the most recent generation number for the chunk; (2) gINC—pass the result of gREAD, get back either the new incremented value or failure, the call locks out reads and writes. gREAD will return generation number but not data and will indicate "locked"; (3) gROLLBACK—pass the value of gINC, rolls back the gINC action; (4) gFLUSH—call all registered users of the NA_LUN, NA_LUN data is stale. The flush event is sent to the users of the NA_LUN along with the LUN_ID; (5) gWRITE—Push the changed data and unlock the NODE.

The client node will make a request to bump the generation number of the associated chunk, giving the old generation number. The client is responsible for making sure the new generation number is only one larger than that of the NA_LUN header. If this succeeds, the chunk is locked and the new generation number is owned by the client, and no new reads can take place on the NA_LUN header. If the old generation number supplied on the gINC was stale and there is no flush lock in place, the gINC will fail. The generation number stored on the header is returned and the client can try again after re-reading the header.

With respect to implementation, the client contacts all mirrors in the generation number increment request. Failure of any mirror to bump count will require a roll-back. The generation increment request carries the physical node ID along with the number of mirrors already held. If a roll-back and retry are required, the client must do its request in sequential fashion, tracking the number of successes. Ties are broken at the server end based on which node has the lowest ID. This is not considered a performance path, two clients should not be hitting the same area. Even if they are, the problem is short lived. After provisioning there is no change in the NA_LUN. In an alternate implementation mechanism, the client must always do its requests in sequential fashion according to the ordinal value of each mirror node. In this way failure can only occur on the first node where a gINC is requested and no rollback will be necessary.

Once a client has a new generation number, it executes a flush against all members of the cache, upon return from the flush, the client issues a write with the new generation number. When the write returns, the lock on the new generation number for external reads and writes is now available. Other nodes requesting a read will get the data along with the new generation number.

With respect to physical block implementation, execution of a gFLUSH by the client indicates that the targeted chunk is a LUN header. The Physical block layer will format the chunk as such and find the CLIENTS field so that it may send flush events to each of the clients. The physical block layer will check the chunk after formatting it by verifying the value in the VLUN cookie field. To save on unnecessary work, the client may send a flag on the gFLUSH call suppressing the actual flush event generation by the physical block layer. The client can do this on all but one of the mirrors.

With respect to BTree Changes, the BTree holds the sparse entries of the chunk list. Each chunk is 32 k, each entry in the sub-array is 128 bits/16 bytes. (chunk ID/lock owner/generation number). Each sub-array is 32 k in length, making it easy to use the gwrite method. This allows for 2048 entries in each sub-array. The array mapping footprint is then 2 k*32 k or 64 Meg. The BTree is structured such that it is read in as a set of contiguous mappings. The client reads these mappings in at the time it reads in the NA_LUN header. Changes to these mappings are done in the same fashion as the header.

With respect to changes to sub-arrays, sub-arrays are read in using the same gRead mechanism. After determining that a sub-array chunk field needs to be filled in, the client undertakes a generation increment request on the associated chunk_id. From here the method proceeds as with the change to the header.

With respect to implementation, the generation and a lock owner, the client making a successful generation increment call, are kept on each chunk entry. This allows the server to grant a request and return a failure along with the physical node ID of the holder. The size of the array is somewhat wasteful for small LUNs, (under 4Megs in size). A small LUN/large LUN mode might be introduced. I.e. Pick the size based on the size of the header and however many chunk objects will fit within one 32 k chunk.

Performance in non-shared case not affected. Except for the NA_LUN header, it is not necessary to exercise the gIO method unless one is sharing access. Let us say a client comes along and registers to open an NA_LUN. It finds after registering that it is the only client member. It proceeds to read, cache, and write the contents of NA_LUN_X as it sees fit. Let us now posit that a second client wishes to participate in reading and writing NA_LUN_X. The first thing it does is to gRead the header, and once it has done so, it asks for an incremented generation number. This it gets. Now it exercises a flush. The first node is contacted. The first node finishes its outstanding I/O and acknowledges the flush. At this point it cannot do any more I/O until the write to the header is completed by the second node and the first node has re-read the header.

With respect to scaling performance with NA_LUNs, it must be remembered that changes to the NA_LUN only take place when new areas are populated. This means that data flushes and synchronization events do not take place during the normal read and write actions on the contents of regions that have already been provisioned. The client node will attempt an update write to add itself to the client list. If no intervening write has taken place, a flush is sent to any other node/client in the NA_LUN cache list.

The SSBLC system enables data synchronization with multiple writers. With respect to the data read/write mechanism for SSBLC, SSBLC guarantees no order with respect to read vs. write. It only guarantees consistency across its mirrors. Further, caching of data when there are multiple writes is disallowed. These two conditions allow for updates with multiple shared writes without distributed locking.

For data writes a variant of gWRITE is employed. This variant incorporates gINC. When a client does a gREAD, the generation number is returned. This number is passed back on a gWRITE. If no intervening writes have taken place, the write will succeed. If an intervening write has taken place, the write will fail. The writer is free to write to mirrors in any order it chooses until it suffers a fail. In this case, it must attempt to write serially to the mirrors in order starting with the mirror with the lowest ordinal value physical node. The writer must continue to attempt to write until it succeeds. It may fail multiple times, but it is guaranteed to succeed eventually.

The recovery write method employs the gINC. A read is done on the lowest ordinal value mirror, a gINC is then attempted. If it fails, another attempt is made. The process is repeated across the set of mirrors. Each successful gINC locks the associated mirror node chunk. When the writer has locked all of the mirrors, it issues a special gWRITE with the highest generation number it encountered in its gINC locking phase.

This method of mirror synchronization provides the best possible performance for non-shared LUNs and shared LUNs where conflict is avoided at a different level. The performance for write conflict resolution is not particularly good but this pathway should not occur in a properly working system. The client would not know which write succeeded. The only purpose of this method is to preserve cross mirror agreement.

It should be noted that mirror data may not agree if the client/writer crashes while trying to update. However, in this case a write was issued with no acknowledge. In this case the data is considered to be indeterminate. The client must undertake a recovery write when it comes back up. Should another client happen upon the inconsistent block while the original client is down, the out-of-sync generation numbers will cause a time-out-based recovery action that syncs all the copies to the latest generation number version.

The SSBLC system enables recovery after crash of a non-logging guest. Should the client employ a file system or data base product that does not include I/O logging and recovery, mirrors may be inconsistent across the NA_LUN. In this case the client may wish to run a read/write exercise across all populated areas of the LUN. Alternatively the client may use an SSBLC utility, "mirror_sync" that reads the generation number of a mirror and then checks it across its companions. Mirror_sync will only run when it has been invoked explicitly. It is much faster than an explicit read/write cycle in that it avoids data movement except where an inconsistency is detected. In this case it may choose any of the copies to propagate. No assumption is made that the copy with the largest generation number is correct. If no logging recovery of partial writes is available, Mirror_sync should be employed during recovery any time an active client crashes.

Crash of a client leaves the metadata of open NA_VLUNs in an open state. This mechanism can be used to ensure a consistency check for non-logging guests. A consistency check, (mirror_sync), across all the chunks of a large LUN takes some time to mitigate this, mirror_sync implementation may CRUSH large ranges of a LUN to create enumerated lists to send to backing stores. The range associated with a list will be chosen based on the trade-off of the chunk-id check request turn-around time v.s. the time to CRUSH the range. The automatic invocation of mirror_sync is the default option for NA_LUNs. Whether or not the customer chooses this option will depend on whether the customer is using a logging file system and can do a point level recovery.

The SSBLC system enables recovery after a client failure. In general, there are two cases to consider in client recovery, that of shared and unshared NA_LUN access.

In the unshared access case, the NA_LUN metadata header will show that only one client has access to the NA_LUN. No effort will be made to update the NA_LUN until another client attempts to connect. When this happens, the list of NA_LUN users will be checked and the stale client will be revealed. The normal procedure for adding a client to a shared NA_LUN is to send a gFLUSH. In both the shared and exclusive cases, the recovery code will check the status of the list of clients prior to sending the gFLUSH. If a stale client is found, the recovery agent will send the gFLUSH to the surviving clients to gain exclusive access. At this point it can remove the failed client from the list, run a mirror_sync and continue on with the effort to add the new client.

In the shared access case, there are a number of synchronization choke points that can be encountered when a client fails while accessing an NA_LUN. These choke points are characterized by: (1) Failure while simply holding access; (2) Failure while holding the MetaData write option; (3) Failure doing a MetaData multi-chunk write transaction; and (4) Failure while updating a LUN data chunk. These will now be considered in reverse order.

With respect to failure while updating a LUN data chunk, a client may fail after doing a gINC but before doing the gWRITE that releases the associated chunk. Further the client may fail at any time after doing the initial gINC. That is, the Mirrors may be in any arrangement of old or new data with any arrangement of gINC settings. In the case where gINC has been employed without the explicit lock on new writes, the recovery will be automatic on the next attempted write by a surviving client. This will occur via the write-recovery method discussed above with reference to data read/write mechanism for SSBLC ([0082]).

If the client does choose to lock during gINC, others attempting to access will wait on their access request. This wait will time-out. When a client experiences this time-out the recovery action is to grab write access to the NA_LUN metadata header. The call is made with the recovery_flag set. This will trigger the discovery of the failed client and a run of mirror_sync.

If there are multiple clients sharing access to an NA_LUN, out of sync mirror data may persist for a region that has not been written until the failed client is discovered. This is considered the client's responsibility. The client needs to synchronize access to a common location through a means external to the SSBLC. i.e. GFS style multi-client synchronization. With this style of synchronization, the transaction associated with the failed client would trigger a protective response from the file system application layer.

With respect to failure while holding the MetaData write option, much of normal read and write activity for the NA_LUN data path elements can proceed while the metadata lock is held if a gFLUSH has not been broadcast. This does not present a problem because the failed client never updated the metadata. If the failed client did update the metadata then the gFLUSH was instituted and all of the sharing clients are stopped, waiting for the update.

In the case where gFLUSH has been invoked, all of the waiting clients will have an outstanding request to read the metadata header active. When these time-out, the clients will request metadata write access with the recovery flag. This will trigger mirror_sync and the clean-up of the client access list. In the case where gFLUSH was not invoked the first surviving client to request access to the metadata header will trigger a recovery mirror_sync action.

With respect to failure doing a MetaData multi-chunk write transaction, when doing a transactional metadata write, all of the chunks of all of the mirrors are locked through a gINC action before a single write is undertaken. In addition one of the copies holds a list of chunks involved in the transaction. All of this is done before a single write is done. Therefore, if the client failure happens at any time before the first write, the rollback is a simple one. The recovery works as it does in the normal MetaData write option. If some writes did start to take place, the recovery will behave as it does in the case of a backing store failure. i.e. If less than a majority of mirrors have been updated the old values will be used. The mirror_sync will behave correctly without prior knowledge of the transaction because any update it would make depends on it gathering all of the mirror copies of a chunk. Any chunk associated with the transaction will have a list of chunks associated with the transaction on one of its mirrors, this is returned on the mirror_sync generation number request. The mirror_sync will then gather all the info from all the mirrors of the transaction related chunks and follow through with the NA_LUNs recovery policy. Related issues are discussed in the context of transaction support for multi-chunk metadata writes. As with normal metadata recovery, recovery is triggered when another client times out trying to read or update the metadata.

With respect to failure while simply holding access, a client may fail while holding the right to access an NA_LUN but without any explicit on-going write action. In this case the client has not left the NA_LUN in an inconsistent state. However, when another client attempts to update the metadata and executes a gFLUSH, the failed client cannot respond. This will cause a timeout on the gFLUSH. The timeout triggers an NA_LUN recovery action to remove the failed client from the access list and to issue a mirror_sync.

A Client LUN mapping service walkthrough is now discussed. With respect to reattaching to a LUN, a request is made to any live node to map an existing LUN, from the front end balancing service. The front end balancing service uses the LUN ID and the target WWN/iqn from the guest to map to the internal 32 bit NA_LUN identifier.

The existing NA_LUN ID was formed by the SSBLC system and as such it has embedded in it the VLUN ID with which it is associated. This can be mapped to the physical node that is presently paired with the VLUN. On the targeted physical storage node, the physical LUN ID is extracted from the NA_LUN and the VLUN is identified and read in via VLUN_0. The initial chunk and mapping information for all VLUNs that are paired with the physical storage nodes are held in VLUN_0. The returned chunk ID is fed through the CRUSH daemon and the header information for the VLUN associated with the targeted NA_LUN mapping is read in from one of the mirrors.

The VLUN header read will either return the needed mapping or indicate the chunk that needs to be read. The physical node will update the VLUN NA_LUN record (e.g., the active clients field in the header) to indicate that the present node will be mapping the NA_LUN. It will also check to make sure that all of the mapping nodes listed in the clients field of the NA_LUN header are up. If they are not, they will be removed.

With respect to the primary node, in order to start a new SSBLC cluster a single node is designated to be the Primary node. At the time of the setup of a new SSBLC cluster this node will be designated by the human administrator. If a cluster is taken down and then brought back up, the primary node will be preserved unless the physical box it is on is no longer part of the cluster. In this case a voting mechanism amongst the members of the Cabal will elect a new primary, assuming a quorum exists. If a quorum does not exist, human intervention is required.

The primary node has several duties. First, sequester disk space for VLUN_0 from its own set of disks. Note that this may involve a local mirroring according to policy. Second, set up the initial CRUSH algorithm and save its configuration in vlun_0. Identify the PAXOS cabal. A minimum of 5 nodes that will be used to hold copies of the vlun_0 contents locally. The contents stored on any cabal member are accessible from any node for access of vlun_0 through CRUSH. Third, monitor and detect the start-up of Cabal and other cluster members. Cause a PAXOS event to change the state of the cluster to reflect the new members. Change CRUSH to reflect the new holders of vlun_0, (the new PAXOS members).

It should be noted that a CABAL may not assign a new primary if less than 3, (50%+1), of the members are present.

The system cannot be restarted without human intervention to decide the real world split brain issue. When power is being restored to a cluster, the primary node should be brought up first followed by the CABAL members. In recovery mode, the system will not try to update its node configuration for a fixed number of minutes, or until human intervention. The choice will be programmable and dependent on the nature of the data center fail over topology and policy.

With respect to Node Associated LUNs (NA_LUNs), a distinction is made between exported LUNs and node associated LUNs to allow for multi-node export. Node associated LUNs are maintained primarily as a means of allocating resource at a physical node without coordinating centrally. The Crush mapping ID is made of the chunk ID, NA_VLUN ID, VLUN ID, and offset, as well as time stamp, policy, etc. The inclusion of the NA_VLUN and VLUN allow each node to give out unique mappings.

The LUNs associated with a physical node are stored in VLUNs, one for each physical node. In this way, the physical storage for the LUN mapping apparatus is stored using CRUSH mappings and is available uniformly across all nodes in the cluster. Any node wishing to export the LUN of another node may do so by calling reading the appropriate part of the VLUN structure.

It should be noted that VLUN structures require no central coordination for single use. However, shared use will require read/write locking. Users of the VLUN will be tracked and notified to relinquish their copies in case of a writer. I.e. Readers are tracked when they request access and write their names into the VLUN header. When writers provisionally lock a chunk, flush requests go to the readers. Once the readers all acknowledge the flush the writer is given access.

With respect to LUN Implementation including space allocation and lookups, there are several types of LUNs: NA_LUNs, VLUNs associated with Physical nodes, VLUN_0, and VLUN_1. Each type has a different use but they share a core space management implementation. All LUN types except for VLUN_0 are backed by 32 k segments that are represented by chunk IDs. These LUNs are self-referential. They manage their own space by managing these chunks. This managed space is driven by a LUN header and a lookup table. The lookup table is open ended. The LUN may be expanded. In the case of the metadata LUNs size can also be reduced.

Each LUN structure handles its own chunk ID enumeration. The chunk ID uniqueness is guaranteed by combining it with the VLUN and NA_LUN IDs. For the backing store used to hold VLUN_2 and VLUN_X metadata, the NA_VLUN value used on CRUSH and in calls to the backing store is 0. In this way, choice of chunk ID is strictly local. One can generate LUN IDs by incrementing a counter. It is extremely unlikely to ever see a wrap on a 2**32 field, but if it ever happened it would be in the case of an NA_LUN. In this case a re-write of the LUN will provide a chunk ID enumeration reset. The external manager would need to be made aware of the remapping of NA_LUN IDs. The chunk ID counter is kept in the LUN header.

A VLUN_X record has two fields identifying an NA_LUN, these fields hold a LUN_ID and the chunk ID that points to the 32 k of storage that holds the header for the LUN. In this way a physical node associated virtual LUN may look up an NA_LUN by its ID and find its header chunk. Upon reading the contents of this chunk, the total metadata space of the NA_LUN is discoverable.

There is an in-memory and an on-disk personality to SSBLC VLUN metadata. The design of the on-disk structures was driven by a need to keep the number of reads/and writes low and to facilitate packing and unpacking. Manipulation of the data in metadata chunks requires unpacking and the setup of in-memory structures. The unpacking is largely passive. To accomplish this, all internal pointers are offsets within the virtual metadata space. The header chunk is the first 32 k of metadata space, the chunk pointed to by the header chunk, the second and so on. As the metadata is read in chunk by chunk, the chunk locations in memory are mapped into an in-memory segment table. When dereferencing a pointer, the bits beyond the 32 k offset in each pointer are used as an index into this table. The base address found there is recombined with the offset within the chunk.

The on-disk relationship of chunks comprising a LUNs metadata is a simple one. The header chunk has a pointer to the first expansion chunk. Each expansion chunk points to the next. This arrangement, while simple does assume that all meta-data for a LUN will be read into memory when the LUN is active. It also requires that the chunks be brought in serially. If these restrictions cause unwanted performance difficulties, a table may be instituted in the first expansion chunk.

The in-memory elements of a LUN's metadata include a red/black tree and a free list. There are multiple entries in each red/black tree element for CHUNK_ID/offset pairs. These entries represent a contiguous range of the LUN space. In the event of a write to a region that hasn't been backed, the new CHUNK_ID for the associated region of an NA_LUN may fit into an existing red/black tree element. In this case only one additional write to disk must take place. That of the chunk that holds the red/black tree element.

In the case a new element must be employed there may be between 1 and 4 distinct writes of chunks. Allocation of a new red/black tree element will require that it be taken off of the element free list and placed in the tree. If all of the elements concerned come from the same chunk, there will only need to be one write. If the elements all come from different chunks there could be three writes. The writes will be: (1) to the new elements data fields and pointers; (2) to the previous free element's next pointer; and (3) to the previous red/black tree's next pointer.

In addition to these writes, it may be necessary to update a pointer in the free list. This update will likely be the header. When removing the 32 k free list element, the top pointer will be updated. To optimize performance, an effort will be made to keep elements backed by a chunk in proximity to each other within the tree. This will reduce the number of multiple chunk metadata updates required.

With respect to transaction support for multi-chunk metadata writes, all multi-chunk metadata updates must be done as transactions. The transaction mechanism must take into account the fact that the metadata is almost certainly mirrored. When doing a transaction style metadata update, a slight variation of the formal synchronized update mechanism is used. (See LUN header object synchronized updates: [0097], [0117].) The variation involves the passing of a chunk list on gINC, a flag to avoid lock release on gWRITE and a complimentary gRELEASE for later release of the lock.

Normally, after a gINC call has been made the following gWRITE will cause the chunk to be unlocked. For transactions, a flag on the gWRITE allows the chunk to remain locked. To start the transaction, the writer will lock all copies of all pages that will be used in the transaction. In addition, the writer will send the list of the chunk_ids involved in one mirror set to each of the chunk targets in that mirror set. This will be the last mirror set updated. At this point the writer is free to write to one copy for each of the chunks involved in the transaction. When the gWRITE is done with the flag preserving the lock, the chunk is not only left locked, it has a second flag set that declares it dirty. The write counter is also incremented.

Should the client fail at any time during the write of the first mirror for the transaction, the recovery action will restore the original values for all pages. This is because the recovery action for a timeout on a locked chunk is to discard the dirty copies as long as there is a clean copy. Based on this logic, the write client can write the entire second mirror set. Again, should the client fail at any time during this process the old values will be restored.

Upon finishing all mirror sets except for the last one, the client begins the process of writing to the final mirror set. In this case the write causes the associated chunk to set a bit declaring that the dirty set is definitive. Should the client die at any point after the first write, the dirty copies will be considered authoritative. This is because during the recovery action when all mirrors for a page are consulted, the transaction chunk list will be detected. At this point, all of the transaction mirror chunks will be consulted. If any of these chunks indicates that dirty is to be authoritative, then the dirty chunks prevail.

It should be noted that for more than three mirrors additional protection is afforded. The client can write to the transaction mirror set as soon as half or more of the mirror sets have been updated and are dirty. After all of the client writes have been completed, the client executes a gRELEASE action. This action clears the dirty flag and removes any transaction chunk lists.

With respect to NA_LUNs, a red/black tree is employed in all LUN types for lookup in a sparsely populated space. Unless dictated by policy, the client's NA_LUN space is not backed by actual storage until it is written to and when it is written to, backing space is allocated in chunks. Because of this, the lookup table may be sparse and may change in size. In the case of NA_LUNs, the red/black tree element is the same size and works the same way as it does for VLUNs however instead of having a LUN ID field it has an offset within the LUN space of the LUN it is providing to the client.

All of the data objects associated with space management, including the red/black tree elements are powers of two and are either of the same size or are modulo of each other and of 32K. This makes space management more efficient.

The LUN header is positioned as the first 32 k in the LUN metadata space. The header has a pointer to the top of the lookup table red/black tree. It also has a field for overall size and a free list of unused ranges of allocated space. The element of the red/black tree has fields for left and right child, color, and an up pointer. The up pointer is a departure from the classic algorithm. It has been added to make it easy to copy and replace elements for garbage collection. Related details are discussed with respect to garbage collection in the SSBLC LUN space.

NA_LUNs manage the space of their clients. SSBLC supports lazy evaluation of storage space. Therefore the disk region allocated to the client may not be fully backed by physical storage until the client chooses to write to specific regions. Red/black tree elements are employed to track the CHUNK_IDs assigned to address regions. The red/black tree elements may cover a range of address space that represents a set of CHUNK_IDs or may contain only one. When a region of space is written to that is not backed, a new red/black tree element is allocated and placed at the appropriate place in the red/black tree. Further, a chunk ID is obtained and the appropriate storage found on the IDs mapped by the CRUSH engine. After a write has completed, the chunk is backed by valid data in accordance with the policy of the LUN.

As with all LUN metadata, free storage is held on a list that is pointed to by a field in the LUN header. The entries in free storage point to ranges of free space. No element on the free list is smaller than 32 k. When a 32 k region is removed from the free list it is broken into elements. All of the unused elements are placed on a list associated with the targeted use. i.e. If a red/black tree element was needed and none was available, a 32 k region is grabbed from the free list and broken into new elements. All of the new elements save one are placed on a free list associated with the red black tree. As with the global free list, the red/black free list is monitored for length and culled in like manner. Related details are discussed with respect to garbage collection in the SSBLC LUN space.

The SSBLC data structures associate Virtual LUNs with physical nodes and VLUN_1. As with NA_LUNs virtual-LUN structures are self-referential. Virtual LUNs differ in that they do not keep track of a virtual disk space. Instead they track a table of LUN_IDs. In the case of VLUN_1, these IDs point to VLUNs that are associated with physical nodes. In the case of VLUNs associated with physical nodes, the LUN records point to NA_LUNs.

Because of this distinction, the field inside of the red/black tree element that points to offset within the client LUN in the NA_LUN is not present in VLUNs. In VLUNs this field is replaced with one that identifies the VIRTUAL LUN record. In both cases the red/black tree element identifies a chunk. In the case of the NA_LUN this chunk backs the region denoted by the offset. In the case of a virtual LUN, it denotes a LUN header.

NA_LUN IDs are granted from a pool in ascending order. Based on this it could be argued that a simple table structure would suffice for the mapping between an NA_LUN ID and the chunk ID associated with its header. However, as NA_LUNs are allocated and destroyed, the namespace for NA_LUNs will become more and more sparse. Use of a red/black tree will insure good behavior even in cases where the discrete table would have resulted in significant ram and disk space wastage.

With respect to VLUN_0, VLUN_0 is not backed by the chunk mechanism. It is backed by a disk of fixed size. The elements in VLUN0 include tables of physical nodes and details about the health of those nodes. VLUN_0 may be implemented on top of raw disk space but because of its special nature and its relatively small size it is likely it will sit on top of a file system for convenience.

With respect to Garbage collection in the SSBLC LUN space, all elements in the LUN space management implementation are union objects of a common root. As such they are the same size. The object size has been constrained to be a power of two and modulo 32 k. With these constraints it is possible to determine the framing of an object just by the offset within the managed address space. A field within the object will be used to recognize its type, if zero the object is on the free list.

In general, garbage collection will only be attempted when the amount of storage on a free list rises above a threshold, or the level of fragmentation of the free list rises above a threshold. In the case of excess free space, LUN space will be surrendered from the top offset. To accomplish this the allocated objects must be copied out of the top offset region. All allocations are done in 32 k chunks. If the top 32 k chunk is not all present on the free list, any missing items are scanned. There is a back pointer in the red/black tree element. This is used to find the parent of an active element. A suitable piece of free space is acquired and data from the element to be removed is copied into it. The parent elements pointer to the targeted object is updated and the old element's space is placed on the free list.

With respect to excess fragmentation, the space on the free list is managed by elements that track ranges of free space. In this way a large range of free space may be represented by a single element. This system is very efficient unless there is a great deal of fragmentation of free space. To avoid excess fragmentation the free list is monitored for length. When the length exceeds a threshold the list is scanned and ranges are merged. In order to do this, the ranges with the smallest amount of space between them are identified. Once identified, the elements are copied and freed as with space reclamation. It should be noted that free-list objects are likely to have fewer fields than red/black tree elements. All elements must be the same size. In order to avoid wasting space, multiple offset/size field pairs may be present in a free space element.

With respect to Chunk data structures, the chunk is employed to provide segmentation of the storage space of a LUN. SSBLC chunk size is theoretically variable but will almost always be 32 k or some modulo of 32 k. 32 k is a preferred size for metadata. Chunk size for data in an NA_LUN will depend on many factors but will tend to be much larger.

Chunks are not themselves physical storage, they are objects that expose a virtualized region of disk. Depending on the policy of the LUN they are associated with they may map to the physical storage of more than one disk on more than one physical node for mirroring or some other form of RAID. Chunk mapping is passive from the chunk object standpoint. The chunk ID along with the LUN policy and the LUN ID are used to map the chunk's storage. No pointers are kept within the chunks to storage locations.

The chunk object is also used as a place to synchronize access. When multiple clients attempt to access a single region of space or when synchronizing the writes between multiple mirrors the chunk object is employed to guarantee proper behavior.

Figure 6:
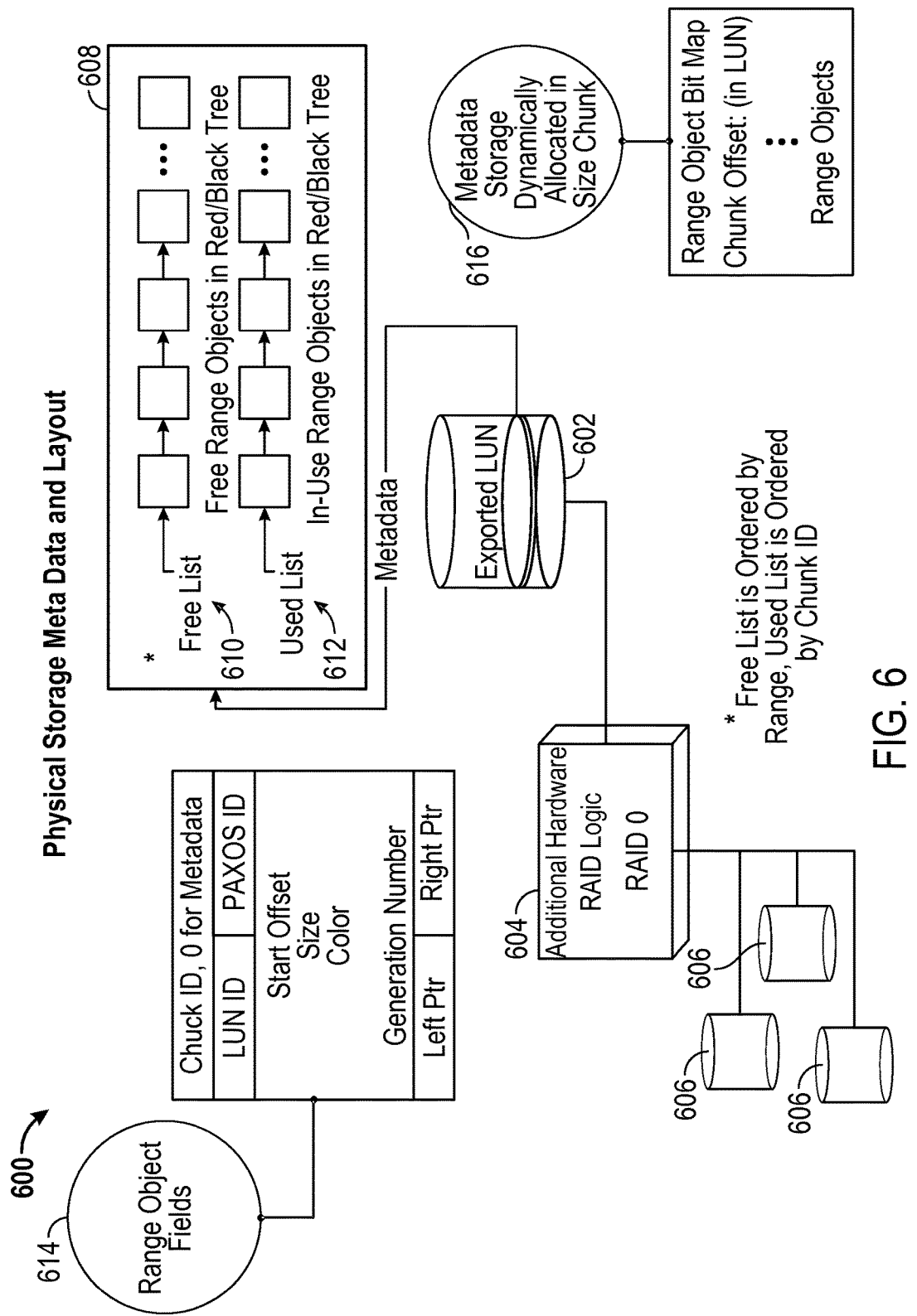
FIG. 6 is a diagram that shows physical storage characteristics corresponding to the embodiments shown in FIGS. 1-4.

FIG. 6 is a diagram that shows physical storage characteristics 600 corresponding to the embodiments shown in FIGS. 1-4. The exported LUN 602 is accessed through additional hardware RAID Logic 604 (e.g., additional RAID Logic 208 in FIG. 2) at a three-way storage mirror with three storage units 606. At these storage units 606, memory is accessed through memory-access data structures 608 including a free-list 610 that includes free-range objects stored in a red/black tree and a used list 612 of in-use range objects stored in a red/black tree. As noted in the figure, range object fields 614 may include fields such as Chunk ID, LUN ID, PAXOS ID, start offset, size, color, and generation number as well as left and right pointers (e.g., to adjacent red/black tree elements). There may also be a multi-chunk write synchronization object attached. Metadata storage 616 may be dynamically allocated including a range object bit map, chunk offset (in LUN), and Range objects.

With respect to physical disk management, disk controllers expose physical disks to SSBLC; these disks may presented one to one or as collections under some form of RAID. In either case SSBLC sees a series of collections of physical storage blocks.

The virtualization of storage required for clustering makes it necessary to manage physical disk blocks. Lists of free and in-use blocks must be kept. The in-use blocks must be kept in a compact fashion where it is easy to find whether a block falls within the in-use category. To do this a red-black tree is employed to keep lookups within log 2 of N. Further, sparse tree methods are employed for the nodes decreasing storage requirements and improving lookup speeds. The node structure will contain the chunk ID, the VLUN ID, the NA_LUN ID, the offset, and the size, The Red/Black tree object will contain the node structure, right and left pointers, and the color.

With respect to the implementation of the physical storage layout, the allocation of space for Metadata structures occurs in 32 k chunks (e.g., 8 pages). The first Metadata allocation structure is the first chunk on the disk. This structure is special in that it also saves pointers to the free list and the used list. A next pointer in the Metadata allocation structure points to the next range object. Background consolidation can be done by traversing the used list for objects in a Metadata allocation structure and substituting others. In this way the Metadata structure can be freed.

It should be noted that fragmentation of range object allocation structure usage may lead to more space being used than is necessary. A background daemon will run from time to time looking for sparsely used Metadata allocation structures, when one is found the used list for objects is traversed looking for range objects belonging to that allocation structure and substituting others.

With respect to chunk allocation and deletion in the free and used lists, insertion or deletion of a chunk of storage is consolidated in a range object structure when possible. When the target range cannot be consolidated a new node is created and the Red-Black algorithm balancing comes into play.

The ordering of the free list has no impact on physical retrieval performance as we are using SSD's. The lack of seek time and the on chip log based file system render the rotational disk notion of physical locality obsolete. However, it is more compact to represent ranges of blocks. Therefore the free list will be arranged using the same mechanisms employed for the in-use list.

With respect to physical access from the NA_LUN, once an I/O request is made by a client and the mapping between the IQN/WWN or its equivalent to the NA_LUN is made, the NA_LUN object is referenced to find the chunk ID or chunk IDs associated with the offset and length of the request. The NA_LUN holds the storage policy in its header. This policy might for instance state that the data is three-way mirrored. In this instance, any read access will require a read of only one of the mirrors; any write will require writes to all of the mirrors.

Assuming the client and the server are at the same PAXOS level, the server will proceed to send the write to the mirror nodes. The mirror node accesses the data via its VLUN, NA_LUN, and offset. Once the write is undertaken the data at each of the nodes is considered indeterminate until the reply is sent back to the guest.

The only synchronization guarantee made by SSBLC is that the data will be identical for all mirrors, no order of read/write is maintained across different clients. When the client has sole access to the NA_LUN as determined by the "CLIENTS" field, no synchronization is necessary. When access is shared, we use the chunk level generation (e.g., synchronization) mechanism to insure that our mirrors agree. In order to maximize performance, we typically only use the strict lock mechanism on the NA_LUN header when there is a conflict. This mechanism can be used for all data, metadata must adhere to a strict NA_LUN locking protocol.

Before initiating a write, the client issues a gINC with the generation number from the previous read on the targeted chunk. gINC is issued to all of the mirrors in sequence according to their ordinal value. The call will increment the generation number but it will also lock the chunk to avoid reads. The new generation number will be returned. After locking all of the mirrors, the client undertakes writes on the nodes. The writes will unlock the chunk for subsequent reads. When the gINC calls are made the generation number passed is compared. If it fails on any but the first mirror, an event is flagged and the primary is notified. Upon failure to get a gINC or to do a read the client will attempt to a gINC on the NA_LUN header. If it fails it can go to sleep waiting on a FLUSH from another party. If it succeeds, it follows through doing a write of the same data. At the end of the process the node vying for the targeted data chunk must have finished its write as is required on the FLUSH action for the header. The same process is followed by a reader when it finds that a data chunk is locked.

It should be noted that the gINC method of write is only done when the client does not have exclusive access to an NA_LUN. This is determined by the NA_LUN header "CLIENTS" field.

A number of issues related to physical node loss and recovery are now discussed.

According to the policy required a user may receive an acknowledge response on a write even when one of its mirrors does not respond. This happens when there remains a quorum of active nodes on which the write has succeeded. In this case we have lost a mirror and the misbehaving node has stale data that must be cleaned up when the node is recovered.

Before the write acknowledge is sent, the primary node must attempt to recover the misbehaving node. If the node cannot be recovered within the short timeout window, a local cluster event changing CRUSH to indicate the dropped node must be initiated and completed. The event may introduce a substitute node. Related issues are discussed with respect to recovery after temporary loss and "fast recovery." This is because a node may have crashed and a reboot will allow it to resume its duties. In this case the node will be back before the long time-out and before it is replaced. Syncing a node that has been down briefly is a much less involved affair than replacing a node.

NODE Recovery is handled at the node management level including the distinction for temporary node loss vs. permanent loss.

With respect to a timeout-based CRUSH state change, after a certain time, loss is considered permanent and new CRUSH is instituted. If a node is rebooted or reconnected within the internet before this time, it still needs to recover as there may have been writes that should have been done to its backing store during its absence.

With respect to recovery after temporary loss and "fast recovery," a network reconnect is performed. For cases where the node temporarily becomes inaccessible a failed write recovery mechanism is possible. If only a few writes have been attempted in a short time window a recovery list is kept. When the list becomes too long or the a timeout is reached, a message is sent declaring the node is down and all further writes do not send the failed write message.

When a failed write occurs on a node that is believed to be alive, a message is sent to the designated recover node (determined by CRUSH), containing the data. The recover node holds the data, or at least a pointer to the chunk and replies once the record has been written. On the first exception write, the recover node will send a message to the prime node notifying it that the failing node is not available and asking to be notified when the node comes back up. When the node is again available, the primary notifies the recovery node. If that node is unavailable, general recovery is undertaken.

After temporary recovery timeout is reached, or the amount of data becomes too large, the recovery node again signals the primary that it has given up temporary recovery. A broadcast message is then sent to all nodes telling them the failing node will now need full recovery action It should be noted that the timeout may well be the same as timeout for CRUSH update (i.e., when the node is declared dead and a new CRUSH mapping is instituted).

With respect to recovery after reboot, when node comes back up, the CRUSH level is checked. If a node finds that it is at the same level, it is because its disappearance had not yet triggered a CRUSH event. At the primary level we get a request to join the cluster. The primary node checks the list of existing members and sees that this node is listed. It therefore recognizes that this is a temporary loss case. If fast recovery is still in effect, the recovery node is signaled and the recovering node is given the already prepared list to recover from.

While no CRUSH event has occurred, the recovering node is still potentially out of sync. The list of chunk IDs to update from the recovery node stands in for the list that is normally constructed by the recovering node and it must be checked before every read or write while recovery is taking place. If this list is not available a heavy weight recovery must be undertaken. When full recovery is required, the primary node must issue a sync_data call to all nodes in the cluster set. This call may be accompanied by the last timestamp laid down by the recovering node before it was rebooted. The cluster peers all run through their backing store sets of chunk data making a list for the recovering node. Only items that are later than the timestamp need be included. The behavior is similar to the CRUSH ID update except that there is no new CRUSH ID to reconcile against the data locally held by the cluster peers. That is, there is only one list to create on each cluster peer and the non-recovering peers do not need to create reconciliation lists for themselves.

At the time of the first failed write attempt, the NA_LUN header of the associated LUN has a field set showing the time of the failure.

With respect to a client node crash, when a client crashes, the NA_LUNs that were active are left open. Later attempts to open the node will discover this and recover the NA_LUN. Since we are dependent on the Client for proper write behavior, it is necessary to scan the NA_LUN to ensure that all of the copies of all of the chunks are in sync.

It should be noted that the method of re-syncing the NA_LUN after a client crash is to create chunk lists from the various participants. If the lists are deemed too unwieldy a timestamp can be done at reasonable intervals and the value placed in the NA_LUN header. In this way any chunk written before the timestamp can be considered in-sync. The timestamp is written to the header of the NA_LUN. When recovery is needed, the backing store participants can create a list that only holds elements later than the timestamp. A cross mirror comparison need only be made if the timestamp on the write is newer than the timestamp in the header. In addition to mismatched generation numbers, any list members from one mirror that aren't present on others will indicate incomplete write actions that occurred when the client died.

In doing a mirror comparison it is only necessary to read the chunk meta-data and return either a timestamp or a generation number. However, the transaction will still slow down recovery. To speed the process the mirrors will scan the chunks of an NA_LUN batch style. The corresponding algorithm includes: (1) creating request lists by running the chunk IDs against the relevant CRUSH; (2) sending the requests lists to the various back-ends to check CRC's timestamps; and (3) coalescing the recovered lists.

After a crash a "lazy sync" may be carried out with respect to an NA_LUN. To speed access after a client crash, the non-sync'd NA_LUN can be used in its dirty state. The only requirement is that all reads must be done to all mirror copies. In this way, any inconsistency will be detected and fixed before the user sees the data. While the NA_LUN is being used this way, the lists are assembled in the background. Any timestamps that date from after the new client has started are ignored, as those writes could be partially complete and have overwritten possible earlier inconsistency.

Certain issues relate to chunk size for extremely large NA_LUNs. For high terabyte and petabyte NA_LUNs, the client crash recover sets will be extremely large. To avoid excessively large lists the chunk size can be increased. Going from 320 k to 32 Megs will reduce the recover set size by a factor of 100. The thin provisioning inherent in SSD's protects storage from excessive unused provisioning. The only downside will be the higher threshold for activity balancing. This might require additional monitoring and reassignment when too many large chunks that are active fall on a single backing store.

With respect to node recovery from the failed node perspective, node recovery is telegraphed by the CRUSH update. When a node first boots it asks for the latest CRUSH level from the primary node. It does this via a broadcast. If the CRUSH level obtained is more than one above its last CRUSH ID, it knows it must undergo general recovery.

The recovering node may have data that is unique (i.e., the only surviving copy). For this reason, the entire disk farm's metadata is scanned for chunks and lists prepared for nodes based on where the chunks are located by the new CRUSH map. These lists are checked by the target nodes. Out of date entries are ignored, relevant data is requested from the recovering node, and orphaned items are passed to the node which owns/owned the associated NA_LUN. If there is no match, the orphaned items list is passed to the primary node.

The recovering node sends an update request to the primary node when it first discovers it needs to re-sync. This update signal is collected with any other nodes the primary has caused to be rebooted and a send_update_list call is sent to all of the relevant nodes. (All nodes that may share mirroring or other RAID backing store duties on overlapping data sets are relevant nodes.) This is not strictly necessary if there is a new CRUSH ID. In this case each node understands that it must reconcile its chunk data against the new CRUSH map. However, the explicit call is still useful as a synchronization point. It also tells a node the names of the other participants it should be expecting to get lists from. After the node has finished its list processing, it sends a response. When all of the responses have been received by the primary node, the state of the cluster can be updated.

The lists of relevant chunk metadata are sent back to the recovering node. The recovering node will expect an update list from each and will not proceed with the next level of recovery until it gets it.

Once the recovering node receives all of the update_lists, it coalesces them. Each entry has a the chunk ID, NA_LUN, VLUN, generation number, other identifying info, and the timestamp of the last chunk write. The recovering node will keep the latest entry for update. It should be noted that the generation number can be incremented on the write or as a separate action if lock is being used. In the case of a lock being found the data on the node will be considered of the lowest value. A previous generation number on another node will take priority. If all of the mirrors hold the same generation number and are locked, the one with the latest timestamp will take priority.

The coalesced list is kept in red_black tree format to aid in fast lookup during the remaining recovery period. This is necessary because I/O is turned back on as soon as there is a complete up-to-date recovery list. Once the coalesced list is created the recovering node can set itself as ready for I/O operations. Any I/O requests that come to the node after this will check the red_black tree first before acting on the backing store. If an entry is found there, the I/O is suspended and the data for the associated node is sync'd. The read or write then proceeds.

A recovering node is part of all new I/O requests before its peers begin to create the recovery lists, or before the fast_recovery mechanism is deactivated. In this way, the recovering node can hold up I/O write requests and no new data writes can take place between the time when recovery list actions start and the recovering node becomes aware of the list.

Issues related to new nodes and returning node recovery are relevant for PAXOS state changes. A new CRUSH algorithm is provided at the time of new or returning node introduction. This is a PAXOS event driven by an external event. However, the new cluster state is an interim one. Once all of the data has been properly placed based on the new CRUSH, another PAXOS event is triggered indicating the cluster is in its fully synchronized state.

In general, a Cabal commit is needed for a cluster wide state change. At the moment of Cabal commit, no node except for the 5 cabal members is aware of the new state. The Cabal members broadcast the state change. Because the cluster is active and will remain so throughout the transition, it is necessary for the cluster to operate in a defined transition configuration. There are four states an individual node may find itself in after a PAXOS change: (1) N−1, not aware of state change; (2) N−1 aware of state change but not reconciled; (3) N—reconciled but not data sync'd; (4) Data sync'd and up to date N state.

In state 1, the node must be able to proceed as if there has not been a state change. It is for this reason that a transaction between any two N−1 nodes must be able to proceed as if the PAXOS update had not taken place. There are two ways that a node may become aware of a PAXOS CRUSH state change. It may get an asynchronous broadcast PAXOS update message or it may initiate or be the subject of a data transaction. It is a race with respect to which event will occur. In either case the node immediately enters state 2. Any on-going transactions are completed and new transactions are suspended. As soon as the on-going I/O's have completed the node works to get to state 3.

In state 2 the node realizes that a PAXOS update has taken place but the data in its backing store reflects the old CRUSH. In order to re-initiate I/O, all data chunks stored must be checked to see if they are up to date and if they should be resident based on the new CRUSH data. Further, any extant chunks within the cluster that should be on the target node must be identified. It is the suspension of I/O during list creation that allows proper synchronization. Once the reconciliation list is completed, checking the list on I/Os, coupled with I/O driven update allows for ongoing I/O activity while there is a mix of updated and updating nodes.

When a node enters state 2 it goes through the collection of chunks it holds in its backing store. Any chunk present is checked to see whether it still belongs on the node with the new CRUSH algorithm and who the other holders of the data are, if any. Lists are prepared with chunk IDs, timestamps, and CRUSH IDs for each of the chunks that are to be resident on other nodes. A list of chunks to be deleted after data sync is kept as well. Each list created is customized for the particular node it is destined for. When the node is finished reviewing its backing store it has a list of nodes to delete, (when moving to state 4), and lists of chunk metadata for each of the nodes sharing ownership of the chunks.

During its time in state 2, a node will receive node availability lists from other nodes in the cluster. These lists are all combined into one list, (the reconciliation list), and the list used to update the backing store. Once a node has created its own lists, including the reconciled list from its peers it is free to move to state 3.

In state 3 a node will allow read and write of data on any chunk in its backing store. However, no read or write can take place without a check of the list of metadata sent from the other nodes. Should an entry be found in the list, a check of the timestamp is made. If the timestamp/generation number is later than the one on the local data, or the local data is missing a request for the remote node's data must be made before a read can be done. A write will succeed if the metadata in the list, or any of the backing store mirrors has the up-to-date generation number, and the write request matches the latest number. (The write will fail otherwise). The list entry will be deleted after this.

In the background the update list is traversed and when an entry with a higher generation number is found or when an entry is available for a missing item in backing store, a request is made. Once the list is traversed, the node is considered data sync'd. Future nodes may become active and provide definitive chunks through their chunk lists but these are either orphaned, or are subject to the write sync and so our updating node is free to discard its now traversed update list.

When entering state 4, the last duty performed by a node in state 3 is to contact the primary node and declare that it is up to date. When the primary gets such notice from all of the participating nodes, it sends a message declaring data sync. It is here that a node enters state 4. In state 4 the node may discard the chunks in its data discard list.

With respect to orphaned data, when a node is compiling its lists of relevant chunk metadata it may come across one or more chunks that no longer belong to it or to any other surviving node. The chunk associated metadata is collected in a special list and sent to the primary after the node enters state 4. The primary node will handle the orphan data either directly or through a proxy. A special "delete orphans" message is sent by the primary when dispensation for the lost blocks has been made. This style of handling allows for action well after data sync.

To this end there are several steps to the handling of orphaned data. In all cases, human intervention, or at least higher level wizards will be needed to dispose of the data. Old NA_LUNs will be known as well as offsets. Mixing this information with the mappings between the NA_LUNs and the SLA based external LUNs will allow for post mortem recoveries. The customer may choose to discard the data or may be able to reconstruct lost LUNs with it. Once the data has been copied out of the orphaned data locations, the primary can send the discard orphans directive.

It should be noted that CRUSH "N" writes with on-going data sync: It is possible that a node will bring itself up to date with respect to all lists known to it and there will be an outlier that has not yet registered its lists. That is, it is not a participant in the new chunk mirrors. In this case the list of n−1 data list will show up sometime after a write may have occurred. This happens when a node comes back up that has been off line through more than one CRUSH cycle. This does not cause an error or loss of data because the chunk metadata will show that the lagging node's chunk is older than the data found on the recovered node and it will be discarded.

With respect to node recovery, there are three cluster transition states: (1) frontend-backend are both in N−1 state; (2) frontend in N state backend in N−1 state; and (3) frontend and backend in N state.

For any given transaction, it does not matter what the broader state of cluster upgrade is. It is the state of the front and back ends associated with the transaction that need to be reconciled. If either the front or the back end are back level and the partner is upgraded, transactions will be blocked until both partners are at the latest CRUSH level. When a back-end node discovers that it must upgrade it suspends all new I/O, lets the ongoing I/O complete, and then sends messages to the out-of-date clients attempting new I/O's that they must upgrade. All remaining suspended I/O's will remain suspended until the updating backend node reaches transition state 3. When a front-end discovers it is out-of-date, it suspends all new I/O requests, completes on-going ones and begins its synchronization process. Once it is nominally up-to-date, it restarts its I/O.

Issues related to node recovery include list processing and chunk handling. When a node is preparing to enter a SSLBC cluster it is in one of three states: (1) initial entry status: Nouveau; (2) re-entry after orderly shutdown: Restart; and (3) re-entry after crash: Recovery. In the nouveau condition there is no stale data to expunge or valuable data to re-map. In the restart and recovery cases every chunk of stored data must be evaluated.

The evaluation of each chunk will lead to one of the following outcomes: (1) the chunk is discarded; (2) the chunk is replaced; and (3) the chunk is sent to a new target. To determine chunk disposition the old CRUSH algorithm that was in effect at the time of the chunk write is consulted as is the most recent CRUSH algorithm. In addition, a list of active nodes and their most recent sync time is consulted as well as the chunk's associated NA_LUN.

A node cannot respond to a read or write request until it has undergone a review of its crush data. Once the review is done it may attempt a read or write. However, if it finds that the CRUSH data is out of date on a request chunk, it must update the data out-of-band before responding.

In-band repair consists of creating PROVIDE and REQUEST lists. I.e. lists of chunks that a node has that are needed by others and lists that must be provided by others. There is potentially a PROVIDE and REQUEST list for each peer node in the cluster. The PROVIDE lists are sent to the target nodes and the requests lists are consolidated in a single action list. In all instances a node cannot finish reconciliation of its backing store until it has received a PROVIDE list from each of its peers, even if the list is empty. Otherwise it will not know when it can proceed to handle incoming I/O requests. Request lists are optional and may be used as a cross check for missing data.

Upon sending lists and receiving lists from others, the recovering node prepares its action list. This is the list of chunks it must read in from other sources. After all chunks have been updated, the recovering node sends a message to the primary node indicating that it is ready to discard its old state. When all nodes have done this, the primary node issues a new PAXOS state. Once this state is in effect all of the nodes may discard their recovery information.

With respect to chunk evaluation, a chunk's PAXOS ID is correlated with a local copy of an out-of-date crush and the chunk's NA_LUN. The NA_LUN is consulted to find the policy associated with the chunk. The CRUSH map is then used to find the associated mirrors. The recovering node then checks the new CRUSH map members. As discussed below, a corresponding decision tree is executed for the case where the recovering node is in the new crush map or the case where recovering node is not in the new crush map.

With respect to the case where the recovering node is in the new crush map, there are two sub-cases. First, in the sub-case where the recovering node holds the last update for the chunk (e.g., sync times for all of the other nodes in the old crush are older than the recovering node or the same and the recovering node has a lower ID) there are two steps: (1) Put the CHUNK_ID, LUN_ID, offset into a list to send to the other recovering nodes; and (2) update the PAXOS ID of the chunk record. Second, in the sub-case where the recovering node does not hold the last update, there are two steps: (1) check the PROVIDE list and use the updated information found. (2) If not found, put the CHUNK_ID, LUN_ID, offset into a request list to send to the authoritative node; set the stale bit in the chunk record.

With respect to the case where the recovering node is not in the new crush map, there are two sub-cases. First, in the sub-case where the recovering node holds the last update for the chunk (e.g., sync times for all of the other nodes in the old crush are older than the recovering node or the same and the recovering node has a lower ID) there are two steps: (1) Put the CHUNK_ID, LUN_ID, offset into a list to send to the other recovering nodes; and (2) mark the chunk for removal after the cluster is synchronized. (e.g., put it in the removal list). Second, in the sub-case where the recovering node does not hold the last update, mark the chunk for removal after the cluster is synchronized. (put it in the removal list)

After chunk list traversal the node puts together its recovery lists and produces an action list. This action list is now traversed and requests are made to update the targeted chunks.

Certain issues relate to transitions between a crashed system and a restored system. In most cases, any surviving copy of data is sufficient to recover the missing mirrors, the exception to this is the transaction. In this case, writes at multiple sites must be in synchrony. This is done with the authoritative switch. In this case a 3 way mirror will be down to a single definitive/authoritative copy for short periods. If the authoritative node for a chunk suffered a crash, the recovery for the LUN cannot be completed within the SSBLC. Intervention at the management level is needed because there is no way to guarantee data integrity. It is expected that the file system contains logging information that can recover any partial writes that were ongoing at the time of the crash.

Certain issues relate to provisioning and placement of SAN Targets. The mapping of NA_LUNs to targets and the placement of those targets on various physical nodes is the work of a service that resides outside of the SSBLC. However, it makes use of SSBLC management protocol to create NA_LUNs and map them, and it uses SSBLC storage for the database of NA_LUN, target pairs and target/client arrangements.

With respect to provisioner storage, the provisioning service uses the SSBLC management interface to set up an NA_LUN and a SAN target. This is similar to the regular NA_LUN creation with one caveat. The NA_LUN and target information are stored within the VLUN_0 and is recallable through a management query. In this way, the Target/LUN mappings information is recoverable even if the provisioning service machine is lost. Provision information includes: (1) registered clients; (2) lists of targets provided to clients; (3) target performance criteria, throughput and latency guarantees; (4) placement of targets on various physical nodes; (5) Target ACLs and Target/NA_LUN associations.

With respect to the provisioning management interface, the SSBLC provisioning management interface has queries for the following: (1) list of physical nodes; (2) list of VLUNs; (3) list of NA_LUNs; (4) NA_LUN/physical node associations; and (5) disk topology, usage, and free space. It should be noted that it is up to the provisioner to keep information regarding the active targets on a physical node for I/O balancing purposes. While it is possible to query an individual physical node to discover its targets this information is not strictly part of the SSBLC cluster state.

The SSBLC provisioning management interface has actions for the following: (1) create an NA_LUN; (2) create a target for an NA_LUN on a physical node; (3) delete a target; (4) delete an NA_LUN. When providing a target for a new client the provisioning service would pick an appropriate physical node. (One that is not too busy and that is network close)

An NA_LUN create call would be made on the VLUN associated with the physical node with the appropriate HA policy. A target with the appropriate ACLs is made to wrap the newly minted NA_LUN. The provisioning agent writes the new provisioning record to its data base and responds to the client storage request. It should be noted that the provisioning agent must be tied into the cluster heartbeat mechanism so that it is notified when a physical node becomes unresponsive. This is done through a notification callback from the SSBLC. The provisioning agent calls the SSBLC provisioner_alert function to set this up.

With respect to provisioning virtual disks, the SSBLC may also export storage through virtual disk technology. The virtual disk is constructed in a device driver on the host system's operating system. Alternatively in hypervisors it is constructed in a virtual device within the hypervisor. The provisioning agent calls a vdisk_create management routine. This routine is local to the physical node and as with the target creation call does not change SSBLC cluster state. The call instructs the physical node SSBLC controller to export a particular NA_LUN to the host via the disk interface. As with target creation the provisioning agent must create a provisioning record and track the provided resource and the health of the clients using it.

As discussed below in further detail, certain example embodiments enable flexible, highly scalable dynamic storage across multiple devices.

According to one embodiment, a network data-storage system includes a first top-level configuration file (e.g., VLUN_0), a second top-level configuration file (e.g., VLUN_1), and a plurality of host configuration files (e.g., VLUN_X) for a plurality of memory-storage hosts. Each host configuration file is assigned to a physical node that corresponds to a memory-storage host. The memory-storage hosts referenced in the host configuration files manage the linear address spaces that are exported as LUNs to clients. The space in the memory-storage host file is stored in chunks with each chunk of data represented by an identifier that will hash to a set of backing store pages. The size of the chunks may be configured on a memory-storage file basis or may be uniform throughout the system. For example, the size of the chunk may be stored as control information within the metadata of the memory-storage file. Fixed-size memory chunks are typically defined as a convenient multiple of a conventional block of memory. For example, a 32K (Kilobyte) chunk may include eight 4K blocks.

It should be noted that words such as first and second are used here and elsewhere for labeling purposes only and are not intended to denote any specific spatial or temporal ordering. Furthermore, the labeling of a first element does not imply the presence of a second element.

The first top-level configuration file may include configuration data (e.g., physical cluster information) for the memory-storage hosts including a memory-storage capacity and a network address for each memory-storage host, one or more hash mappings for sequential states of the data-storage system, where each hash mapping identifies a plurality of memory storage hosts to store a memory chunk in the data-storage system in accordance with a policy for storing the memory chunk, and a reference to the second top-level configuration file. For example, a hash mapping may be understood as an implementation of a CRUSH algorithm that operates on memory chunk identifiers to determine multiple distributed storage locations in the system according to the RAID policy associated with a memory storage file. Typically, the system stores a current hash mapping that reflects the current state of the system as well as a previous hash mapping, which may be employed for data recovery, and possibly a future hash mapping that represents a possible future system state.

The second top-level configuration file may include a reference to an arrangement of the host-level configuration files included within a host configuration mapping (e.g., a node table) that relates host-level configuration files to memory-storage hosts.

Each host configuration file may include a reference to an arrangement of memory-storage host files that embody Logical Unit Numbers (LUNs) that are exported to clients of the storage array. The memory storage hosts store memory chunks across the multiple devices by using a hash mapping (e.g., CRUSH mapping) to identify multiple distributed storage locations for each memory chunk. The hash mapping may be adapted to require minimal data transfers when a memory-storage host enters or leaves the system.

Access to the first and second top-level configuration files may be stored on a restricted number of memory-storage hosts in order to centralize management. The backing store for the data within these files will be mirrored to provide redundancy (e.g., the 5 Paxos Cabal members will act as memory-storage hosts). The backing store used to hold the second top-level file and the multiple host configuration files as well as the memory-storage host files may also be held across the privileged cabal members or may be distributed more widely according to policy. The reason for the distinction is that mapping of storage for all the nodes in the system is dependent on the top-level configuration files. However, the scope of Individual host configuration files and memory-storage files is limited to individual physical nodes. The second top-level configuration file and the multiple host configuration files make use of the CRUSH mechanism and are stored via the current hash mapping. However the first top-level configuration file, which is relatively compact, is typically not stored via the hash mapping and so may be accessed independently of the hash mapping.

In operation, the first and second top-level configuration files are accessed to retrieve physical cluster level information regarding the nodes in the cluster and their health. The second top-level configuration file is accessed specifically to find specific host configuration files. A client wishing to access a LUN must know which physical node is hosting the LUN, this is information is retrieved by accessing the top-level configuration files.

The host configuration files are accessed to find storage mapping files. The client will provide the name of the memory-storage host file and the host configuration file will be consulted to gain access.

Each storage mapping file maps chunks of storage to a linear address space that embodies a storage LUN. The client accesses the data in that LUN via reads and writes against offsets within the linear address space of the storage mapping file.

Figure 8:
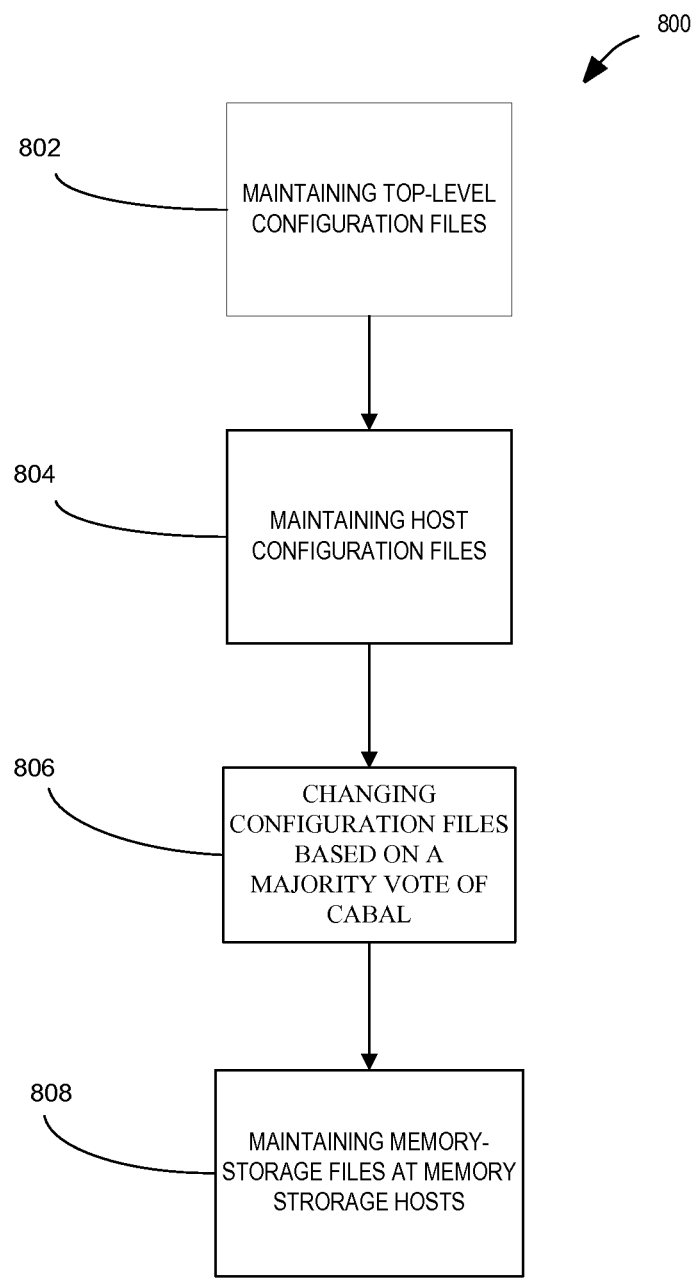
FIG. 8 is flow chart that shows a method of managing a storage system for an example embodiment.

In accordance with an example embodiment, FIG. 8 is flow chart that shows a method 800 of managing a storage system that includes a plurality of memory-storage hosts. A first operation 802 includes maintaining a first top-level configuration file and a second top-level configuration file for the memory-storage hosts, the first top-level configuration file identifying an arrangement of the memory-storage hosts, and the second top-level configuration file identifying a plurality of host configuration files that identify storage by the memory-storage hosts. A second operation 804 includes maintaining the host configuration files corresponding to the memory-storage hosts, each host configuration file identifying a corresponding memory-storage file that provides one or more Logical Unit Numbers (LUNs) that correspond to storage by a corresponding memory-storage host.

The cabal that includes a plurality of the memory-storage hosts may operate to maintain the top-level configuration files by a majority voting process. Then an optional third operation 806 includes changing configuration files based on a majority vote of a cabal.

The first top-level configuration file may identify a hash mapping for the memory-storage hosts, and each memory-storage host may use the hash mapping to distribute memory chunks included in corresponding LUNs across the storage system. Under these conditions, the method 800 may further include changing the hash mapping based on a majority vote of a cabal that includes a plurality of the memory-storage hosts when a given memory-storage host enters or leaves the storage system.

The first top-level configuration file may include network addresses and storage capacities of the memory-storage hosts. The second top-level configuration file may include a mapping between identifiers of the memory-storage hosts and identifiers of physical nodes that correspond to the storage provided by the memory-storage hosts. Each memory-storage host may be identified with a physical node that corresponds to the storage provided by that memory-storage host.

An optional fourth operation 808 includes maintaining the memory-storage files at the memory-storage hosts to provide corresponding one or more LUNs at each memory-storage host, each LUN including a plurality of memory chunks.

Figure 9:
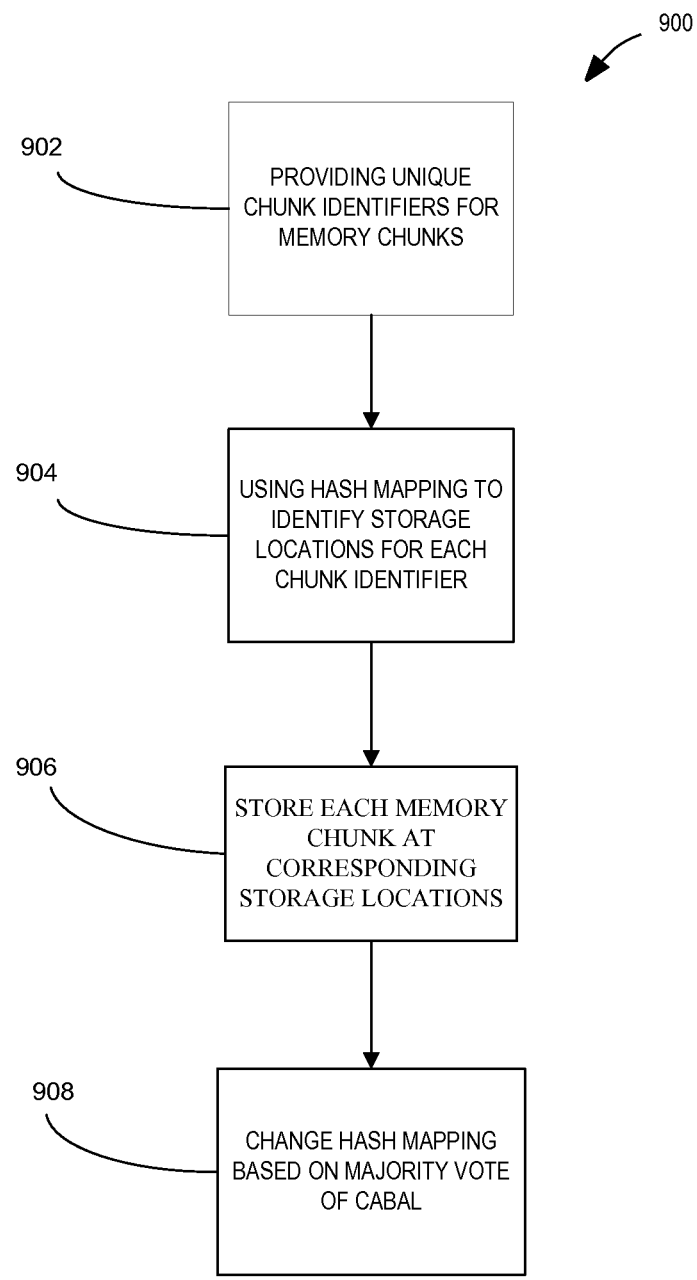
FIG. 9 is flow chart that shows a method of storing a file for an example embodiment.

In accordance with an example embodiment, FIG. 9 is flow chart that shows a method 900 of storing a file in a storage system that includes a plurality of memory-storage hosts. A first operation 902 includes providing unique chunk identifiers for memory chunks included in the file. A second operation 904 includes using a hash mapping to identify one or more storage locations for each chunk identifier, each storage location corresponding to a portion of a memory-storage host. A third operation 906 includes storing each memory chuck at the corresponding one or more storage locations identified by the hash mapping.

A cabal that includes a plurality of the memory-storage hosts may maintain the hash mapping by a majority voting process. Under these conditions, an optional fourth operation 908 includes changing a hash mapping based on a majority vote of the cabal.

The memory chunks may have a uniform size given by an integral multiple of a memory block size associated with the storage system.

Using the hash mapping may include generating a random number of shares that are allocated to memory-storage hosts to identify the one or more storage locations for each chunk identifier. Under these conditions, the method 900 may further include changing the hash mapping based on a majority vote of a cabal that includes a plurality of the memory-storage hosts when a given memory-storage host enters or leaves the storage system, the changed hash mapping including a re-allocation of shares to current memory-storage hosts of the storage system. Alternatively under these conditions, the method 900 may further include changing the hash mapping based on a majority vote of a cabal that includes a plurality of the memory-storage hosts when a given memory-storage host enters the storage system, the changed hash mapping including a re-allocation of shares from previous memory-storage hosts to the given memory storage host. Alternatively under these conditions, the method 900 may further include changing the hash mapping based on a majority vote of a cabal that includes a plurality of the memory-storage hosts when a given memory-storage host leaves the storage system, the changed hash mapping including a re-allocation of shares from the given memory-storage host to remaining memory-storage hosts.

Additional embodiments correspond to systems and related computer programs that carry out the above-described methods. For example a system may include at least one computer (e.g., as in FIG. 10) to perform software and hardware operations for modules that carry out aspects of the method 800 of FIG. 8 and the method 900 of FIG. 9.

Figure 10:
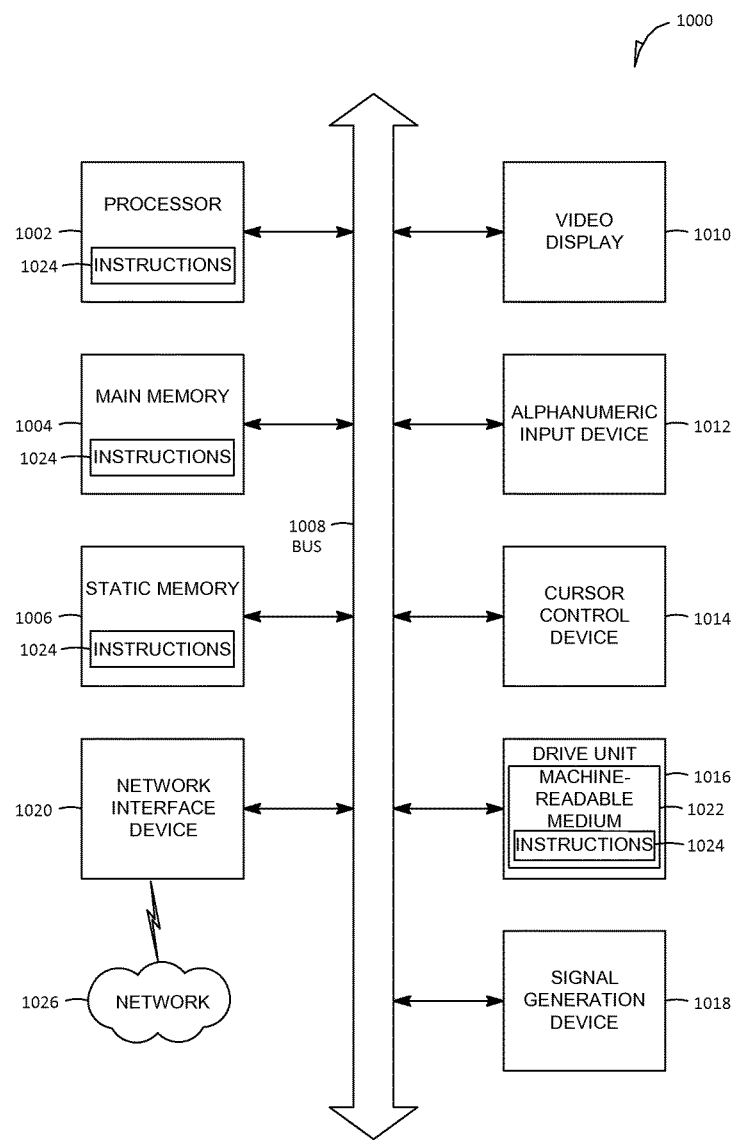
FIG. 10 is a block diagram that shows a computer processing system within which a set of instructions for causing the computer to perform any one of the methodologies discussed herein may be executed.

FIG. 10 shows a machine in the example form of a computer system 1000 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) cursor control device 1014 (e.g., a mouse), a disk drive unit 1016, a signal generation device 1018 (e.g., a speaker), and a network interface device 1020.

In some contexts, a computer-readable medium may be described as a machine-readable medium. The disk drive unit 1016 includes a machine-readable medium 1022 on which is stored one or more sets of data structures and instructions 1024 (e.g., software) embodying or utilizing any one or more of the methodologies or functions described herein. The instructions 1024 may also reside, completely or at least partially, within the static memory 1006, within the main memory 1004, or within the processor 1002 during execution thereof by the computer system 1000, with the static memory 1006, the main memory 1004, and the processor 1002 also constituting machine-readable media.

While the machine-readable medium 1022 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 1024. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, optical media, and magnetic media. Specific examples of machine-readable or computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; compact disc read-only memory (CD-ROM) and digital versatile disc read-only memory (DVD-ROM).

The instructions 1024 may further be transmitted or received over a communications network 1026 using a transmission medium. The instructions 1024 may be transmitted using the network interface device 1020 and any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner.

In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of storing a file in a storage system that includes a plurality of memory-storage hosts, the method comprising:
   providing unique chunk identifiers for memory chunks included in the file;
   using a hash mapping to identify a plurality of storage locations for each chunk identifier by
   using the hash mapping with an input that includes a chunk identifier to identify a plurality of storage locations for the chunk identifier, each storage location for the chunk identifier corresponding to a portion of a memory-storage host that is identified from an output of the hash mapping with the input that includes the chunk identifier;
   providing metadata corresponding to the hash mapping to a memory-management unit, the metadata being used to access the hash mapping, and the memory management unit being configured to implement the hash mapping for the plurality of memory-storage hosts;
   maintaining, at each memory-storage host of the plurality of memory-storage hosts, a shared memory with the memory-management unit, the shared memory including one or more buffers for accessing storage locations of that memory-storage host by the memory-management unit, the memory-management unit operating to add access commands for reading or writing data to the one or more buffers of the shared memory of each of the plurality of memory storage hosts, and each of the plurality of memory-storage hosts operating to implement related one or more of the access commands for reading or writing data at one or more corresponding storage locations via the one or more buffers of its shared memory with the memory-management unit; and storing each memory chunk of the memory chunks included in the file at the corresponding plurality of storage locations identified by the hash mapping by using the memory-management unit to implement the hash mapping for the corresponding chunk identifier and to access the shared memory of each of the memory-storage hosts corresponding to the plurality of storage locations identified by the hash mapping.

2. The method of claim 1, wherein a cabal that includes a plurality of the memory-storage hosts maintains the hash mapping by a majority voting process.

3. The method of claim 1, wherein the memory chunks have a uniform size given by an integral multiple of a memory block size associated with the storage system.

4. The method of claim 1, wherein using the hash mapping includes generating a random number of shares that are allocated to memory-storage hosts to identify the plurality of storage locations for each chunk identifier.

5. The method of claim 4, further comprising:
changing the hash mapping based on a majority vote of a cabal that includes a plurality of the memory-storage hosts when a given memory-storage host enters or leaves the storage system, the changed hash mapping including a re-allocation of shares to current memory-storage hosts of the storage system.

6. The method of claim 4, further comprising:
changing the hash mapping based on a majority vote of a cabal that includes a plurality of the memory-storage hosts when a given memory-storage host enters the storage system, the changed hash mapping including a re-allocation of shares from previous memory-storage hosts to the given memory storage host.

7. The method of claim 4, further comprising:
changing the hash mapping based on a majority vote of a cabal that includes a plurality of the memory-storage hosts when a given memory-storage host leaves the storage system, the changed hash mapping including a re-allocation of shares from the given memory-storage host to remaining memory-storage hosts.

8. The method of claim 1, wherein using the hash mapping includes generating a random number of shares that are allocated to the memory-storage hosts to identify the plurality of storage locations for each chunk identifier by randomizing across storage locations of the storage system, the hash mapping identifying for a given memory chunk a plurality of the memory-storage hosts that operate to store the given memory chunk by selecting from the storage locations of the storage system in accordance with a storage policy corresponding to the hash mapping, and the memory-storage hosts collectively operating to maintain the hash mapping by a majority voting process.

9. The method of claim 1, wherein for each chunk identifier, the hash mapping identifies a plurality of storage locations at separate memory-storage hosts, the hash mapping providing a randomized selection of the separate memory-storage hosts and a randomized selection of each storage location at each separated memory-storage host.

10. The method of claim 1, wherein the shared memory of a memory-storage host of the plurality of memory storage hosts includes an input/output queue configured to implement reading and writing operations corresponding to one or more of the access commands between a controller of the memory-management unit and a controller of the memory-storage host, the reading and writing operations being implemented via a connecting communication bus between the memory-management unit and the memory-storage host and by bypassing a main memory for the memory-management unit and the memory-storage host.

11. A non-transitory computer-readable medium that stores a computer program for storing a file in a storage system that includes a plurality of memory-storage hosts, the computer program including instructions that, when executed by a computer, cause the computer to perform operations comprising:

providing unique chunk identifiers for memory chunks included in the file;

using a hash mapping to identify a plurality of storage locations for each chunk identifier by using the hash mapping with an input that includes a chunk identifier to identify a plurality of storage locations for the chunk identifier, each storage location for the chunk identifier corresponding to a portion of a memory-storage host that is identified from an output of the hash mapping with the input that includes the chunk identifier;

providing metadata corresponding to the hash mapping to a memory-management unit, the metadata being used to access the hash mapping, and the memory-management unit being configured to implement the hash mapping for the plurality of memory-storage hosts;

maintaining, at each memory-storage host of the plurality of memory-storage hosts, a shared memory with the memory-management unit, the shared memory including one or more buffers for accessing storage locations of that memory-storage host by the memory-management unit, the memory-management unit operating to add access commands for reading or writing data to the one or more buffers of the shared memory of each of the plurality of memory storage hosts, and each of the plurality of memory-storage hosts operating to implement related one or more of the access commands for reading or writing data at one or more corresponding storage locations via the one or more buffers of its shared memory with the memory-management unit; and storing each memory chunk of the memory chunks included in the file at the corresponding one or more storage locations identified by the hash mapping by using the memory-management unit to implement the hash mapping for the corresponding chunk identifier and to access the shared memory of each of the memory-storage hosts corresponding to the plurality of storage locations identified by the hash mapping.

12. The non-transitory computer-readable medium of claim 11, wherein a cabal that includes a plurality of the memory-storage hosts maintains the hash mapping by a majority voting process.

13. The non-transitory computer-readable medium of claim 11, wherein the memory chunks have a uniform size given by an integral multiple of a memory block size associated with the storage system.

14. The non-transitory computer-readable medium of claim 11, wherein using the hash mapping includes generating a random number of shares that are allocated to memory-storage hosts to identify the plurality of storage locations for each chunk identifier.

15. The non-transitory computer-readable medium of claim 14, wherein the computer program further includes instructions that, when executed by the computer, cause the computer to perform operations comprising:

changing the hash mapping based on a majority vote of a cabal that includes a plurality of the memory-storage hosts when a given memory-storage host enters or leaves the storage system, the changed hash mapping including a re-allocation of shares to current memory-storage hosts of the storage system.

16. The non-transitory computer-readable medium of claim 14, wherein the computer program further includes instructions that, when executed by the computer, cause the computer to perform operations comprising:
changing the hash mapping based on a majority vote of a cabal that includes a plurality of the memory-storage hosts when a given memory-storage host enters the storage system, the changed hash mapping including a re-allocation of shares from previous memory-storage hosts to the given memory storage host.

17. The non-transitory computer-readable medium of claim 14, wherein the computer program further includes instructions that, when executed by the computer, cause the computer to perform operations comprising:
changing the hash mapping based on a majority vote of a cabal that includes a plurality of the memory-storage hosts when a given memory-storage host leaves the storage system, the changed hash mapping including a re-allocation of shares from the given memory-storage host to remaining memory-storage hosts.

18. A system storing a file in a storage system that includes a plurality of memory-storage hosts, the system including at least one processor configured to perform operations for processor-implemented modules including:
a processor-implemented chunk-identifier module that provides unique chunk identifiers for memory chunks included in the file;
a processor-implemented first hash-mapping module that uses a hash mapping to identify a plurality of storage locations for each chunk identifier by using the hash mapping with an input that includes a chunk identifier to identify a plurality of storage locations for the chunk identifier, each storage location for the chunk identifier corresponding to a portion of a memory-storage host that is identified from an output of the hash mapping with the input that includes the chunk identifier;
a processor-implemented second hash-mapping module that provides metadata corresponding to the hash mapping to a memory-management unit, the metadata being used to access the hash mapping, and the memory management unit being configured to implement the hash mapping for the plurality of memory-storage hosts;
a processor-implemented shared-memory module that maintains, at each memory-storage host of the plurality of memory-storage hosts, a shared memory with the memory-management unit, the shared memory including one or more buffers for accessing storage locations of that memory storage host by the memory-management unit, the memory-management unit operating to add access commands for reading or writing data to the one or more buffers of the shared memory of each of the plurality of memory storage hosts, and each of the plurality of memory-storage hosts operating to implement related one or more of the access commands for reading or writing data at one or more corresponding storage locations via the one or more buffers of its shared memory with the memory-management unit; and
a processor-implemented storage module that stores each memory chunk of the memory chunks included in the file at the corresponding plurality of storage locations identified by the hash mapping by using the memory-management unit to implement the hash mapping for the corresponding chunk identifier and to access the shared memory of each of the memory-storage hosts corresponding to the plurality of storage locations identified by the hash mapping.

\* \* \* \* \*

UNITED STATES PATENT AND TRADEMARK OFFICE
CERTIFICATE OF CORRECTION

PATENT NO. : 9,697,226 B1  
APPLICATION NO. : 13/967289  
DATED : July 4, 2017  
INVENTOR(S) : Chris Youngworth Page 1 of 1

It is certified that error appears in the above-identified patent and that said Letters Patent is hereby corrected as shown below:

In the Claims

In Column 36, Line 44, in Claim 1, after "by", delete "¶"

Signed and Sealed this
Tenth Day of April, 2018

Andrei Iancu
*Director of the United States Patent and Trademark Office*